(12) United States Patent
Katsuta

(10) Patent No.: US 7,663,044 B2
(45) Date of Patent: Feb. 16, 2010

(54) MUSICAL PERFORMANCE SELF-TRAINING APPARATUS

(75) Inventor: Masanori Katsuta, Hamamatsu (JP)

(73) Assignee: Kabushiki Kaisha Kawai Gakki Seisakusho, Hamamatsu-shi, Shizuoka (JP)

( * ) Notice: Subject to any disclaimer, the term of this patent is extended or adjusted under 35 U.S.C. 154(b) by 454 days.

(21) Appl. No.: 10/649,874

(22) Filed: Aug. 26, 2003

(65) Prior Publication Data

US 2004/0055441 A1    Mar. 25, 2004

(30) Foreign Application Priority Data

| Sep. 4, 2002 | (JP) | ............. 2002-259369 |
| Sep. 10, 2002 | (JP) | ............. 2002-264177 |
| Sep. 11, 2002 | (JP) | ............. 2002-265633 |
| Sep. 17, 2002 | (JP) | ............. 2002-270350 |
| Sep. 19, 2002 | (JP) | ............. 2002-273310 |
| Sep. 19, 2002 | (JP) | ............. 2002-273311 |

(51) Int. Cl.
*G09B 15/00* (2006.01)
*G09B 15/02* (2006.01)
*G09B 15/04* (2006.01)

(52) U.S. Cl. ............... 84/470 R; 84/477 R; 84/478; 84/486.2; 84/485 R

(58) Field of Classification Search ............ None
See application file for complete search history.

(56) References Cited

U.S. PATENT DOCUMENTS

| 5,315,911 | A | 5/1994 | Ochi |
| 6,066,791 | A * | 5/2000 | Renard et al. ............. 84/477 R |
| 6,645,067 | B1 | 11/2003 | Okita et al. |
| 7,157,638 | B1 * | 1/2007 | Sitrick ...................... 84/477 R |
| 2001/0039870 | A1 * | 11/2001 | Shimaya et al. ............... 84/478 |
| 2003/0024375 | A1 * | 2/2003 | Sitrick ...................... 84/477 R |

(Continued)

FOREIGN PATENT DOCUMENTS

JP    58-130385    8/1983

(Continued)

OTHER PUBLICATIONS

Office Action dated Jan. 23, 2008 for corresponding Japanese Patent Application No. 2002-259369.

(Continued)

*Primary Examiner*—Marlon T Fletcher
(74) *Attorney, Agent, or Firm*—Christie, Parker & Hale, LLP

(57) ABSTRACT

The apparatus of the present invention improves training efficiency, and monotonous repetition of training is avoided. A unit acceptance judgment section (4) judges whether all performance of the units in the current rank have reached an acceptable standard or not. When all performance is accepted, a unit in an upper rank is designated. The performance data in the designated unit is read from a performance data storage (7) to a key depression instruction generator (8), and a key depression instruction is displayed based on the performance data. When only a part of the unit in the current rank is acceptable, a unit updating instruction is output to a lesson menu display (14), to thereby display that the unit subsequent to the currently designated is the unit to be played next. When the unit is updated, the unit having the same note information as that already accepted is not designated.

11 Claims, 28 Drawing Sheets

U.S. PATENT DOCUMENTS

| | | | |
|---|---|---|---|
| 2003/0167903 A1* | 9/2003 | Funaki | 84/477 R |
| 2003/0167904 A1* | 9/2003 | Itoh | 84/609 |
| 2004/0035284 A1 | 2/2004 | Tamura et al. | |
| 2006/0101984 A1* | 5/2006 | Ikawa et al. | 84/609 |

FOREIGN PATENT DOCUMENTS

| | | |
|---|---|---|
| JP | 5-27670 | 2/1993 |
| JP | 5-119692 | 5/1993 |
| JP | 5-224666 | 9/1993 |
| JP | 9-237088 | 9/1997 |
| JP | 09-305171 | 11/1997 |
| JP | 9-305171 | 11/1997 |
| JP | 10-161673 | 6/1998 |
| JP | 10-187022 | 7/1998 |
| JP | 10-254435 | 9/1998 |
| JP | 10-301568 | 11/1998 |
| JP | 11-296168 | 10/1999 |
| JP | 2000-56756 | 2/2000 |
| JP | 2000-122672 | 4/2000 |
| JP | 2000-148143 | 5/2000 |
| JP | 2000-237455 | 9/2000 |
| JP | 2001-51586 | 2/2001 |
| JP | 2001-145778 | 5/2001 |
| JP | 2001-242863 | 9/2001 |
| JP | 2001-352206 | 12/2001 |
| JP | 2002-175072 | 6/2002 |

OTHER PUBLICATIONS

Office Action dated Mar. 27, 2008 for corresponding Japanese Patent Application No. 2002-273310.
Patent Abstract of Japan, Publication No. 09-305171, Published on Nov. 28, 1997, in the name of Haruyama Kazuo.
Patent Abstract of Japan, Publication No. 2001-242863, Published on Sep. 7, 2001, in the name of Shimatani Hideaki et al.
Patent Abstract of Japan, Publication No. 2001-352206, Published on Dec. 21, 2001, in the name of Matsuzuka Takayuki.
Patent Abstract of Japan, Publication No. 2002-175072, Published on Jun. 21, 2002, in the name of Nishimoto Tetsuo.
Patent Abstract of Japan, Publication No. 09-305171, published on Nov. 28, 1997, In the name of Kazuo.
Patent Abstract of Japan, Publication No. 10-161673, published on Jun. 19, 1998, in the name of Kanehisa, et al.
Patent Abstract of Japan, Publication No. 2000-122672, published on Apr. 28, 2000, in the name of Shingo.
Patent Abstract of Japan, Publication No. 2000-148143, published on May 26, 2000, in the name of Kazuo, et al.
Patent Abstract of Japan, Publication No. 2001-242863, published on Sep. 7, 2001 in the name of Hideaki et al.
Patent Abstract of Japan, Publication No. 2002-175072, published on Jun. 21, 2002 in the name of Tetsuo.
U.S. Notice of Allowance dated Dec. 15, 2008, for related U.S. Appl. No. 11/946,731, indicating relevance of listed reference in this IDS.

* cited by examiner

| INSTRUCTED KEYS | | | | | ... | ... | |
|---|---|---|---|---|---|---|---|
| NOTE NUMBER | 60 | 60 | 67 | 67 | ... | ... | 60 |
| MODEL KEY-ON TIME | 0 | 96 | 192 | 288 | ... | ... | 4416 |
| MODEL KEY-OFF TIME | 80 | 176 | 272 | 368 | ... | ... | 4536 |
| MODEL VELOCITY | 100 | 100 | 100 | 100 | ... | ... | 90 |

Fig. 24

| DEPRESSED KEYS | B1 | B2 | B3 | B4 | ... | ... | BN |
|---|---|---|---|---|---|---|---|
| KEY-ON TIME | 3 | 90 | 315 | 408 | ... | ... | 6720 |
| KEY-OFF TIME | 50 | 142 | 374 | 457 | ... | ... | 6845 |
| VELOCITY | 85 | 87 | 65 | 91 | ... | ... | 77 |
| NUMBER OF MISSTOUCHES | 0 | 0 | 2 | 0 | ... | ... | 0 |

Fig. 25

| DEPRESSED KEYS | B1 | B2 | B3 | B4 | ... | ... | BN |
|---|---|---|---|---|---|---|---|
| ADJUSTED KEY-ON TIME | 0 | 59.6 | 208.7 | 270.4 | ... | ... | 4453.2 |
| ADJUSTED KEY-OFF TIME | 33.1 | 94.1 | 247.8 | 302.8 | ... | ... | 4536 |
| KEY-ON TIMING EVALUATION | 5 | 5 | 1 | 1 | ... | ... | 1 |
| STEP TIME EVALUATION | 5 | 5 | 1 | 5 | | | 4 |
| KEY-OFF TIMING EVALUATION | 4 | 3 | 1 | 1 | ... | ... | 1 |
| GATE TIME EVALUATION | 3 | 3 | 3 | 3 | | | 4 |
| ADJUSTED KEY-ON TIMING EVALUATION | 5 | 3 | 4 | 5 | ... | ... | 5 |
| ADJUSTED STEP TIME EVALUATION | 5 | 3 | 2 | 3 | ... | ... | 5 |
| ADJUSTED KEY-OFF TIMING EVALUATION | 4 | 1 | 3 | 3 | ... | ... | 5 |
| ADJUSTED GATE TIME EVALUATION | 2 | 2 | 2 | 2 | | | 5 |
| TEMPO RATIO | 1.51 | | | | | | |

| A. TEMPO EVALUATION | 3 |
| --- | --- |
| B. KEY-ON TIMING EVALUATION | 4 |
| C. KEY-OFF TIMING EVALUATION | 3 |
| D. RHYTHM EVALUATION | 2 |
| E. SOUND VOLUME EVALUATION | 4 |
| F. MISS-TOUCH EVALUATION | 4 |

| NO. | PITCH | KEY-ON TIMING OF INSTRUCTED NOTE | PERFORMED KEY-ON TIMING | EVALUATION |
|---|---|---|---|---|
| 1 | 60 | 0 | 4 | S |
| 2 | 60 | 96 | 81 | A |
| 3 | 67 | 192 | 220 | C |
| 4 | 67 | 288 | | |
| ⋮ | ⋮ | ⋮ | | |
| ⋮ | ⋮ | ⋮ | | |
| | | | | |
| | | | | |

| NO. | PITCH | KEY-ON TIMING OF INSTRUCTED NOTE |
|---|---|---|
| 1 | 69 | 380 |
| 2 | 69 | 492 |
| 3 | 67 | 561 |
| ⋮ | ⋮ | ⋮ |
| ⋮ | ⋮ | ⋮ |

| No. | PITCH | PERFORMED KEY-ON TIMING | EVALUATION |
|---|---|---|---|
| 1 | 60 | 380 | S |
| 2 | 69 | 492 | |
| 3 | 69 | 561 | |
| ⋮ | ⋮ | ⋮ | |
| ⋮ | ⋮ | ⋮ | |
| | | | |
| | | | |

| No. | TIMING | SIGN ID | FILE NAME (STORED PLACE) |
|---|---|---|---|
| 1 | 376 | 32 | Trill.htm |
| 2 | 1950 | 1 | Finger Crossing.htm |
| 3 | 6400 | 17 | http://www.pm.ne.jp/tech21.htm |
| : | : | : | : |
| : | : | : | : |

| | | |
|---|---|---|
| 𝄂𝄂 | PEDAL ON | OPERATE A DAMPER PEDAL (INDICATED BY A DECORATIVE CAHARACTER OF PED. IN THE BLANK SPACE UNDER THE STAFF AT THE BOTTOM IN THE GREAT STAFF). FROM HERE, OPERATE THE RIGHT PEDAL. |
| ✻ | PEDAL OFF | RELEASE THE DAMPER PEDAL (INDICATED BY A SIGN ✻ IN THE BLANK SPACE UNDER THE STAFF AT THE BOTTOM IN THE GREAT STAFF). FROM HERE, RELEASE THE PEDAL. |

EXPLANATION AND PERFORMANCE POINT
··· FINGER CROSSING
! FINGER CROSSING IS A METHOD FOR DEPRESSING A KEY BY THE THUMB, BY CROSSING THE THUMB UNDER THE INDEX FINGER AND THE MIDDLE FINGER, SUBSEQUENT TO THE DEPRESSION WITH THE INDEX FINGER OR MIDDLE FINGER. IN THE MUSICAL SCORE BELOW,
"▼" INDICATES THE TIMING OF FINGER

MUSICAL PERFORMANCE SELF-TRAINING APPARATUS

CROSS REFERENCE TO RELATED APPLICATION

This application claims priority of Japanese Patent Application No. 2002-259369, filed on Sep. 4, 2002, Japanese Patent Application No. 2002-264177, filed on Sep. 10, 2002, Japanese Patent Application No. 2002-265633, filed on Sep. 11, 2002, Japanese Patent Application No. 2002-270350, filed on Sep. 17, 2002, Japanese Patent Application No. 2002-273310, filed on Sep. 19, 2002, and Japanese Patent Application No. 2002-273311, filed on Sep. 19, 2002.

BACKGROUND OF THE INVENTION

1. Field of the Invention

The present invention relates to a musical performance self-training apparatus, and more specifically, relates to a musical performance self-training apparatus that can enable efficient lesson by designating a lesson part of music to be performed, corresponding to the skill level of a player in the musical performance for a given music.

The present invention also relates to a musical performance self-training apparatus that can avoid such a situation that the training becomes boring, by having a mode in which a player him/herself can determine the training progress and a mode in which the progress is instructed automatically.

Moreover, the present invention includes a musical performance judgment apparatus that can specifically evaluate if musical performance has been done as instructed by a performance instruction based on performance data prepared in advance.

2. Description of the Related Art

There is known an apparatus which plays performance data stored in a recording medium by a personal computer, and displays an image representing sheet of music sequentially on a screen, to thereby give a performance instruction. For example, in Japanese Patent Application Laid-Open No. Hei 9-305171, there is disclosed an apparatus which gives a performance instruction in a manner of a music box in which keys are instructed sequentially by graphical bars. More specifically, in this apparatus, a figure of a keyboard is displayed on a screen, and a scroll bar having a length corresponding to the duration of key depression is also displayed corresponding to each key on the displayed keyboard, and this scroll bar is scrolled so that the scroll bar approaches the keyboard figure, as the auto-playing data is played.

According to this conventional performance instruction apparatus, the player can recognize the duration of key depression intuitively, and a key to be depressed subsequent to the key being depressed now can be known in advance. Therefore, even a player who cannot read the musical score can play smoothly, different from the apparatus which indicates performance with displaying the musical score.

However, with the conventional performance instruction apparatus, since the performance data is only played sequentially from the beginning which is monotonous, efficient training cannot be conducted and the player become bored. For example, it is quite difficult for a player, who is training for given music for the first time, to play from the top of the music to the very end all the way through. Moreover, even if the player interrupts on the way to return to the beginning, or return to a desired training part, it is troublesome and time-consuming to search the part to be played.

In a music the same phrase appears in a plurality of places, even when this phrase is mastered, when the player has the training all the way through, he/she has to play this phrase many times, and hence lesson may becomes boring. It is not efficient and not desirable to have repetitive training for the phrase mastered to a certain degree, from a viewpoint of mastering the entire music as soon as possible.

Therefore, a system in which the skill level of the entire music can be efficiently enhanced is desired, by avoiding repetition of training for the mastered phrase.

Moreover, even if there is a part which the player wants to train selectively, with the apparatus which advances training so that the entire music can be mastered at a certain skill level, selection of the training part or training progress against his/her will may be forced on the player.

In order to solve the above problem, a mode can be considered in which the player can freely determine the training progress to play, but if this mode is for freely playing far apart from the automatic mode in which the progress is instructed automatically, the relation between the automatic mode and this mode becomes weak, and hence consistent training cannot be performed. There is also a demand for a musical performance self-training apparatus, which keeps freedom in selecting progress by the player, while maintaining the training function by the automatic mode.

Furthermore, even if a player who cannot read the musical score can play certain music by an apparatus which displays a performance instruction in a manner of a music box, it is not applicable to a case in which another music is played, since the player is not able to become read the score. In other words, it is difficult to play without the performance instruction in the manner of the music box at all times.

Therefore, there is a demand for an apparatus which makes it possible not only to play particular music but also to finally play any music by reading a score, by appropriately adopting training by the score, while having training according to the performance instruction displayed in the manner of the music box.

Since the scroll bar is scrolled forward when a player has played at a right pitch, it stands by until the player plays at a right pitch, without proceeding to the next performance instruction. By this method, training can be steadily advanced, while confirming whether each note is played at the right pitch. However, according to this instruction method, the performance is standardized, and variations in performance are not allowed. Therefore, it is insufficient in view of enjoying the musical performance.

Therefore, a musical performance judgment apparatus, which is set such that even if the music performance is not conducted as instructed by the performance data, the music is advanced so long as the musical performance is within a range of a predetermined pitch, has been proposed (Japanese Patent Application Laid-Open No. 2002-175072). In this publication, it is also disclosed that players can learn performance techniques while enjoying the music, by allowing liberal judgment for the performance of music having high degree of difficulty or by adjusting the judgment method and the judgment standard in the same performance data, depending on the age and ability.

As described above, it has been heretofore considered that a player has training while confirming the played tone one by one, to learn the key-on sequence, and then gives a musical performance along to the accompaniment and metronome sound, thereby the player can finally give a natural musical performance with good tempo.

However, with respect to the rudimentary training in which a player gives a musical performance while confirming the played note one by one, and the advanced training in which the player gives a musical performance along to the accompaniment and metronome sound, a single-level performance instruction cannot correspond to these various level of trainings, since the difference in degree of difficulty between these trainings is too large.

If the ability of a trainee is finely judged, to adjust the judgment method and the judgment standard for the training highly accurately, the trainee can give a musical performance reasonably, and improvement can be expected. However, the judgment method and the judgment standard have heretofore been adjusted only according to whether the pitch is as instructed.

Therefore, there is a demand for a system, which can multilaterally judge the performance result of a trainee to recognize the ability, and determine the judgment method and the judgment standard based on the ability.

There is also proposed an apparatus which can output performance evaluation during performance or after finishing the performance (Japanese Patent Application Laid-Open No. 2001-242863). Moreover, there is known an apparatus in which when the music has not been played as instructed, for example, when a key of the right note has not been pressed, the next performance instruction is not given, nor the performance is not evaluated.

However, if the performance instruction is stopped when a player has not played correctly, a problem may occur. When the player has noticed a miss-touch, he/she can replay again immediately, but if the player has noticed a miss-touch after having played for a while, he/she must return to the beginning to give a performance again. In this case, since the evaluation after having stopped the performance instruction is not given, the player cannot know the performance evaluation, and must return to the beginning to give a performance again, without being convinced.

With such a performance instruction apparatus, the player pays attention only to the performance instruction, and cannot enjoy the performance. Trill, tremolo and the like are ways of rendition finely repeating a plurality of notes, but the number of repetition should be essentially left to the sensibility of the player. With the conventional performance instruction apparatus, however, if the number of repetition is not performed as instructed, the performance instruction is not advanced forward. Therefore, there is a demand for an apparatus which enables performance by giving much weight to the performance flow, and which can express the sensibility of the player.

In a conventional performance instruction apparatus, a player can only get information, which can be read from notes and a clef described on a musical score, and information indicating the performance timing. However, higher performance technique such as fingering cannot be understood from the musical score. Moreover, a beginner may not be able to understand the meaning of the sign written on the musical score.

As described above, in order to actually give a good performance, there are matters which a player should know other than the information expressed by the musical score, but in the conventional performance instruction apparatus, the information cannot be informed. Therefore, there is a demand for means with which the player can search the information, which is not written in the musical score, as required.

SUMMARY OF THE INVENTION

It is the first object of the present invention to provide a musical performance self-training apparatus, which makes it possible to repetitively train for a part having not mastered yet, to thereby efficiently master the entire music.

It is the second object of the present invention to provide a musical performance self-training apparatus, which can change the training progress by the player him/herself, while maintaining the function capable of instructing progress automatically.

It is the third object of the present invention to provide a musical performance self-training apparatus, which aims at being able to read the score gradually, while playing according to the performance instruction.

It is the fourth object of the present invention to provide a musical performance judgment apparatus, which can multilaterally judge the performance result of a trainee to judge the ability of the trainee highly accurately.

It is the fifth object of the present invention to provide a musical performance self-training apparatus, which can give the performance instruction and evaluation of the performance result, without impairing the music flow and the sensibility of the player.

It is the sixth object of the present invention to provide a musical performance self-training apparatus, which can search information other than the information written in the musical score, according to need, during the training.

In order to accomplish the above objections, the present invention is constructed as follows.

The apparatus of the present invention comprises a unit designating means for designating a unit from the plural units, the units constitute a music to be performed and each unit includes a predetermined size of musical tone information, and a performance instruction information generating means for generating the performance instruction information based on the musical tone information of the unit which is designated by the unit designating means.

The apparatus of the present invention further comprises a lesson menu generating means for generating an image information of a lesson menu which has a score of the music to be played and the units corresponding to the score, then output the image information to the display means, wherein the unit designating means designates a unit automatically, which unit corresponding to the score of the performance instruction information to be displayed next.

In the present invention, the lesson menu having the units which are provided to include wider range of musical tone information, as the skill level become higher, are displayed according to the skill level corresponding to the score, and the unit designating means designates a unit to be played at the earliest timing, in which performance thereof has not reached a predetermined acceptable standard, of the units on the lesson menu, as a unit of which performance instruction is to be displayed next, and when performance of all units in the same skill level has reached the acceptable standard, the unit of which performance instruction is to be displayed next is selected from units in the upper ranking skill level than the current skill level and designated.

Accordingly, the player can confirm the music to be played by the lesson menu in which the musical score is included.

A unit of the displayed music in the lesson menu is designated in order from the earliest one timewise, and the performance instruction information included in the unit is displayed. A unit reached to an acceptable standard is not designated any longer, and the next earlier unit timewise is then designated.

If the performance related to all units of the same skill level reach the acceptable standard, the player cannot advance to the upper level training, and hence the player can be reliably master the music. If the player can performance related to the units of certain level collectively, the player can advance to the lesson of the units in the upper skill level including these units.

In the present invention, the unit designating means being constructed so as to be able to operate selectively in an automatic mode or manual mode. And, the automatic mode or manual mode is selected by operating the mode select switch displayed in the lesson menu on the display apparatus.

Accordingly, the mode of designating unit is not limited to the automatic mode, that is, the player can designate the unit according to the lesson progression, and hence the lesson progression can be advanced or delayed, optionally.

The present invention further comprises the performance judgment apparatus, wherein the performance judgment apparatus comprises a performance result storage means for storing information relating to performance timing as a result of musical performance, a judgment means for comparing the information relating to the performance timing with the information relating to the performance timing included in the performance instruction and detecting the difference between these, and an evaluation means for evaluating the performance, corresponding to the difference detected by the judgment means.

In the performance result storage means a plurality of items are stored in the performance result storage means for each played note, as the information relating to the performance timing, and the evaluation means extracts the items evaluated best of the plurality of items with respect to all played notes, to evaluate the musical performance according to the mean value thereof.

In the present invention, the performance evaluation is graphically displayed for each of the information comprehensively.

Accordingly, the information relating to the performance timing is compared between the actual performance and the performance instruction to evaluate the performance. Therefore, the rhythmic sense of the player can be judged and the accuracy of performance can be judged, different from the evaluation by simply judging whether the pitch agrees with the pitch in the performance instruction. Particularly, the musical performance is evaluated in a plurality of evaluation items judged based on the information relating to the performance timing, and based on all tones through the performance. As a result, detailed judgment of ability becomes possible.

Since a plurality of items is displayed comprehensively, the strong point and weak point of the player can be easily judged.

The apparatus of the present invention comprises a score view mode display means for displaying performance instruction information in which performance timing information is added to the note information arranged on a staff, a piano roll view mode display means which associates a mark having a length corresponding to the length of the note with a keyboard figure and displays the performance timing with a distance between the mark and the keyboard figure, and a changeover means for optionally selecting either the score view mode display means or the piano roll view mode display means.

The display means of each mode is constructed so as to display the evaluation together with the performance instruction information, and is constructed so as to add a check to the note information or the mark of the note which has not been played as instructed, and display an annotation therefore together.

Since the performance instruction can be displayed in an optional mode of the score view mode or the piano roll view mode, the performance instruction can be displayed in a display mode which a player desires.

Moreover, the note which could not be played as instructed becomes clear, and a point different from the instruction can be specifically displayed by the annotation therefore.

The apparatus of the present invention comprises a played note storage means for storing played notes, a means for suspending the progress of performance instruction when a note is not played at a pitch as instructed by the performance instruction, a performance data row detection means for searching a performance data row whose array coincides with a plurality of played notes including at least the newest played notes stored in the played note storage means, from the performance data, and a control means for resuming the progress of performance instruction from the row subsequent to the performance data row, when the coincident performance data row is searched.

The played note storage means stores a predetermined number of played notes after the played note, which has not been played at a pitch as instructed by the performance instruction.

The played notes are stored in a buffer. When the note is not played at the instructed pitch, the performance instruction is suspended, and the performance data row, which agrees with the played note row stored in the buffer in view of the array, is detected. The performance instruction is then started from the row subsequent to the performance data row. In other words, the played notes are stored, and when a note has not been played at the instructed pitch, a pattern agreeing with the stored played notes in view of the array is searched in the performance data. In this manner, when a player has made a miss-touch or played an optional music part according to his/her preference, the key-on instruction is suspended once, but the performance position is immediately detected to resume the key-on instruction.

When notes are played (in the case of keyed instrument, key-on) at the pitch instructed by the performance instruction (in the case of keyed instrument, key-on instruction), the performance instruction is given for the next score information. On the other hand, when the notes are not played as instructed, that is, when the notes are not played as instructed due to a miss-touch or due to a performance technique by intention, the played notes after the played note information are stored in the buffer for the predetermined number. The performance data corresponding to the played notes stored in the buffer is detected, and the key-on instruction is restarted from the note subsequent to the performance data. Therefore, the performance instruction catches up with the actual player's performance at a point in time when the corresponding performance data is detected. According to this feature, the area of the buffer can be reduced.

The apparatus of the present invention comprises a means for displaying an advice icon, which informs the existence of advice information for musical performance, together with the performance instruction information, and a means for searching and displaying the advice information relating to the performance instruction information at a position where the advice icon is displayed, in response to the operation of the advice icon.

The advice information is searched through the Internet.

When a player finds an advice icon, while reading the displayed musical score and playing, the player can operate the icon. Therefore, if there is anything which the player wants to know relating to the performance by the displayed musical score during the performance, he/she can operate the icon to search the advice information such as the playing technique.

Particularly, since the advice information can be obtained and displayed through the Internet, it is not necessary to prepare various kinds of advice information beforehand in a memory of the musical performance self-training apparatus.

BRIEF DESCRIPTION OF THE DRAWINGS

FIG. 8 is a diagram showing an example of a lesson menu in which unit setting is inappropriate;

FIG. 9 is a diagram showing an example of a lesson menu in which unit setting is reset appropriately;

FIG. 23 is a diagram showing one example of performance data;

FIG. 24 is a diagram showing one example of the performance result stored in a memory;

FIG. 25 is a diagram showing one example of sub-evaluation, which becomes the grounds for the comprehensive evaluation;

FIG. 41A is a diagram showing another display example of the key depression instruction information; FIG. 41B is a diagram showing another display example of the searched advice information.

DETAILED DESCRIPTION OF THE PREFERRED EMBODIMENT

Figure 2:
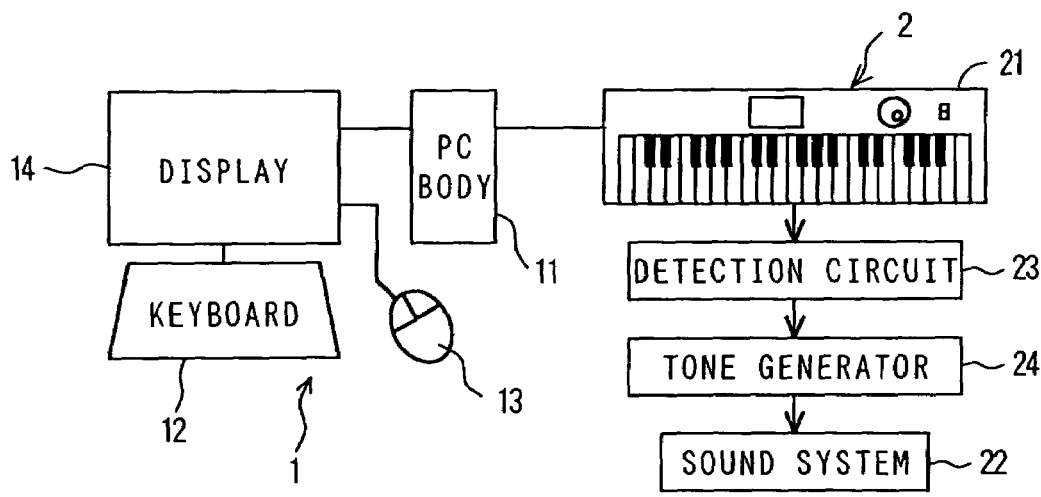
FIG. 2 is a system block diagram of the musical performance self-training apparatus according to the first embodiment of the present invention.

The present invention will be described in detail, with reference to the drawings. FIG. 2 is a block diagram showing the constituent of the musical performance self-training apparatus according to one embodiment of the present invention. In the FIG. 2, a personal computer 1, that is, a PC comprises a PC body 11, a keyboard 12 and a mouse 13 as an input unit, and a display 14 as an output unit. For the PC body 11, one having a known constituent having a hard disk, ROM, RAM and the like can be used. It is desired that the PC body 11 comprise an interface that can input and output an MIDI (musical instrument digital interface) signal.

A keyboard instrument 2 comprises a keyboard 21 and a sound system 22. The keyboard instrument 2 comprises a detection circuit 23 connected to the keyboard 21 to detect key depression and key release information on the keyboard 21, and a tone generator 24 for generating tone corresponding to the key-on or key-off information. When the detection circuit 23 detects key depression or key release on the keyboard 21, the tone generator 24 generates the tone, based on the depressed key number (key number), the key-on length, the key-on velocity and the like, and outputs (produces) musical sound through the sound system 22. It is desired that the keyboard instrument 2 also comprise an MIDI. The overall operation of the keyboard instrument 2 is controlled by a microcomputer (not shown).

The PC body 11 and the keyboard instrument 2 are connected via an interface such as the MIDI (not shown), so that a signal can be transferred between these.

Figure 20:
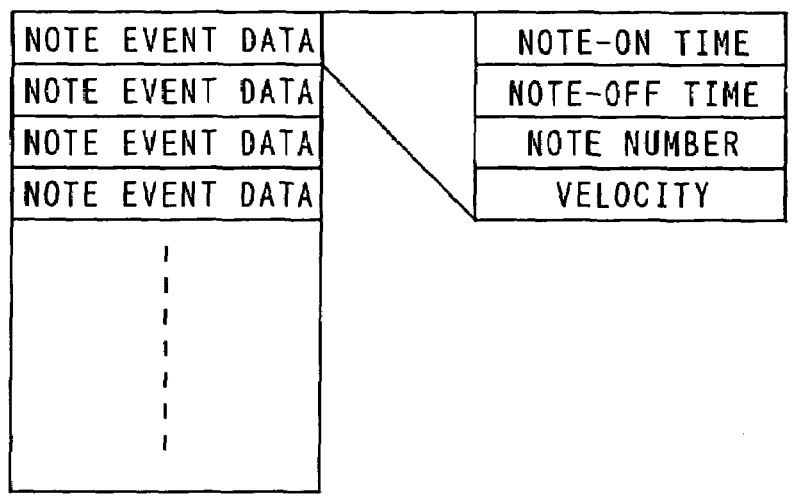
FIG. 20 is a diagram showing an example of main configuration of performance data.

In the musical performance self-training apparatus, music information for training can be externally supplied, or one which is stored in a known storage medium such as a hard disk in the PC body 11 beforehand may be used. The music for training is prepared as performance data such as note number provided in the MIDI standard, key-on time, key-off time, velocity, and tempo data. A construction example of the performance data is shown in FIG. 20. The performance data may include data other than the above-described data, but it is not the main part of the present invention, and hence the description thereof is omitted.

The selected music information can be played not only from the beginning, but may be played halfway of the music. The training part may be automatically designated, or may be designated manually by the player him/herself. The training part can be designated for each predetermined range (referred to as a unit). The unit comprises notes which are included in one or a plurality of bars, and as the degree of skill level, that is, the grade becomes higher, the number of bars constituting one unit increases.

Here, explanation is given by assuming that the unit is composed of a plurality of bars, but the construction or the number of the bars which constitutes the unit is variable, and may be composed of not only the bars, but also optional part of the music. For example, musically natural training is possible, by constituting one unit by one or a plurality of motifs or phrases. In short, it is only necessary to constitute the unit so as to include wide range of note information, so that as the rank, that is, the skill level becomes higher, the player can have training for longer performance at a stretch.

In the case of automatic mode in which the unit is automatically designated, the training unit is automatically designated according to the predetermined progress. For example, the skill level is automatically judged by the PC 1 based on the performance result, to designate the unit for next performance, taking into consideration that the player does not train repetitively for the unit in which the skill level has reached the acceptable standard. On the other hand, in the case of manual mode in which the unit is manually designated, the player him/herself can selectively designate the unit which he/she wants to have training. The manual mode may be released to return to the automatic mode, or the lesson may be interrupted during the automatic mode to optionally designate a unit. A data for generating a mode selection display on a screen can be included in the performance data so as to be displayed on the display 14 at a predetermined timing.

Figure 3:
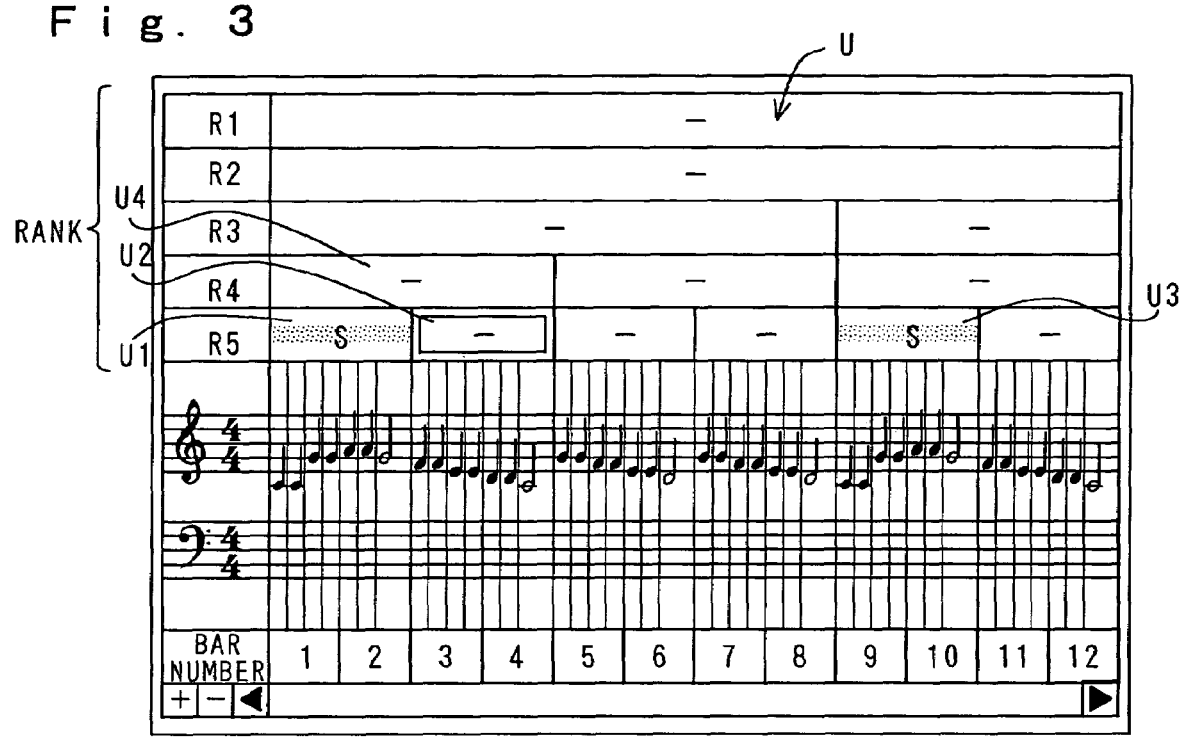
FIG. 3 is a diagram showing a display example of a lesson menu.

FIG. 3 is a diagram showing one example of the lesson menu displayed on the display 14, the diaphragm includes units for each rank corresponding to the score. In FIG. 3, one or plural unit U which has various size are set for each rank, with respect to the score for 12 bars displayed on the display 14. When the music is longer than the length of one screen, the part on the right side where the part without the clef, the key signature and the time signature is scrolled from the right to the left on the screen, to thereby display up to the last part of the music score. Alternatively, instead of scrolling on the screen, the part of the music or the whole part may be displayed, by enlarging or reducing the display size. For example, displayed buttons "+" and "−" on the left bottom corner on the screen can be operated to scale the screen.

The skill level in the performance is designated as rank R1, R2, R3, R4 and R5 in order of from the higher rank, and the unit in which the size, that is, the number of bars included therein, is changed is set corresponding to each rank. In the lowest rank R5, two bars constitute one unit, and in the next higher rank R4, four bars constitute one unit. In this manner, as the rank becomes higher, the number of bars constituting one unit increases.

The lesson menu is a list, in which the result based on the performance result can be seen at a glance, and is also a display of the next training unit. When the music performance of the designated unit has finished, the performance result is compared with the prepared model performance data, to judge the result. The result is displayed in the lesson menu with a character representing the grade, and the unit which has not reached the acceptable standard is designated again.

In the example shown in FIG. 3, it is displayed with a stripe of spot pattern that the training of unit U1 consisting of the first bar and the second bar in rank R5 has finished, and unit U2 consisting of the third bar and the fourth bar is displayed with a frame as the next training unit. The result is displayed in the unit already played. The result is displayed with characters of S, A, B, C and D in order of higher grade. In the units U1 and U3 having reached the acceptable standard, the character of grade "S" and a band indicating acceptance are displayed. However, this classification of result is an example only, and the number of grades can be optionally set, and the acceptable standard can be elevated, as the rank becomes higher. When the acceptable standard has not been reached, the designation of the unit is not updated, and the same unit is designated again.

In the mode of automatically designating the unit, a unit to be played at the earliest timing in the same rank, of the units which has not reached the acceptance mark, is designated.

Since the result of the unit having the same musical tone information is managed collectively, as shown in the FIG. 3, when the unit U1 has reached the acceptance mark, the unit U3 consisting of the ninth and the tenth bars having the same music tone information or note data array as that of the unit U1 is regarded as having trained already, and the result including the stripe and the character "S" indicating the evaluation is displayed. Therefore, it is avoided to have repetitive training of the mastered unit.

When a unit is designated, the key depression instruction described later is displayed on the display 14, based on the prepared performance data of the designated unit. The player can repetitively train according to the display of the key depression instruction, until the skill level of performance is enhanced for each unit, that is, a predetermined acceptance judgment is obtained.

When all units are judged as being acceptable with respect to the current training rank, the player can proceed to the next higher rank, where a unit having a larger size, that is, a unit having a large number of bars is designated, and the performance data for this unit is played. For example, when the player has come up to the standard in rank R5, the player proceeds to rank R4, where unit U4 is designated, and the performance data is played. In rank R4, the player has training for the number of bars twice the number in rank R5 at a stretch or without interruption. As the rank becomes higher, the degree of difficulty, that is, the tempo and the acceptable standard is increased, thereby training of higher degree corresponding to the skill level becomes possible. Judgment of the player's rank will be described later.

On the other hand, in the case of training in the manual mode, the unit is designated selectively, by the player's own will, to play the performance data. Therefore, training can be performed repetitively until the trainee is satisfied. However, if the player can totally optionally designate the unit in the manual mode, the training may not be resultful, and hence it is desired that the rank cannot be elevated until the performance result reaches the allow able level. In other words, until all units in the current rank reach the acceptance mark, only the unit in the current rank can be designated, and the unit in the higher rank cannot be designated.

Each unit can have the data structure described below. That is, unit result information, link information and result information can be included as the data of each unit.

The unit result information shows training result for each unit, and can include high score, average score, registered date of result, and the like. The unit having the same musical tone information is managed with the common unit result information, with a unique ID enabling identification of the unit.

The link information is registered for each unit, and having the lead position and the tail end position (both are set as time information) of the unit based on the beginning of the music, and a link ID which links a plurality of units having the same musical tone information. The result information has array information of the link information for each rank and each unit in the entire music.

Figure 4:
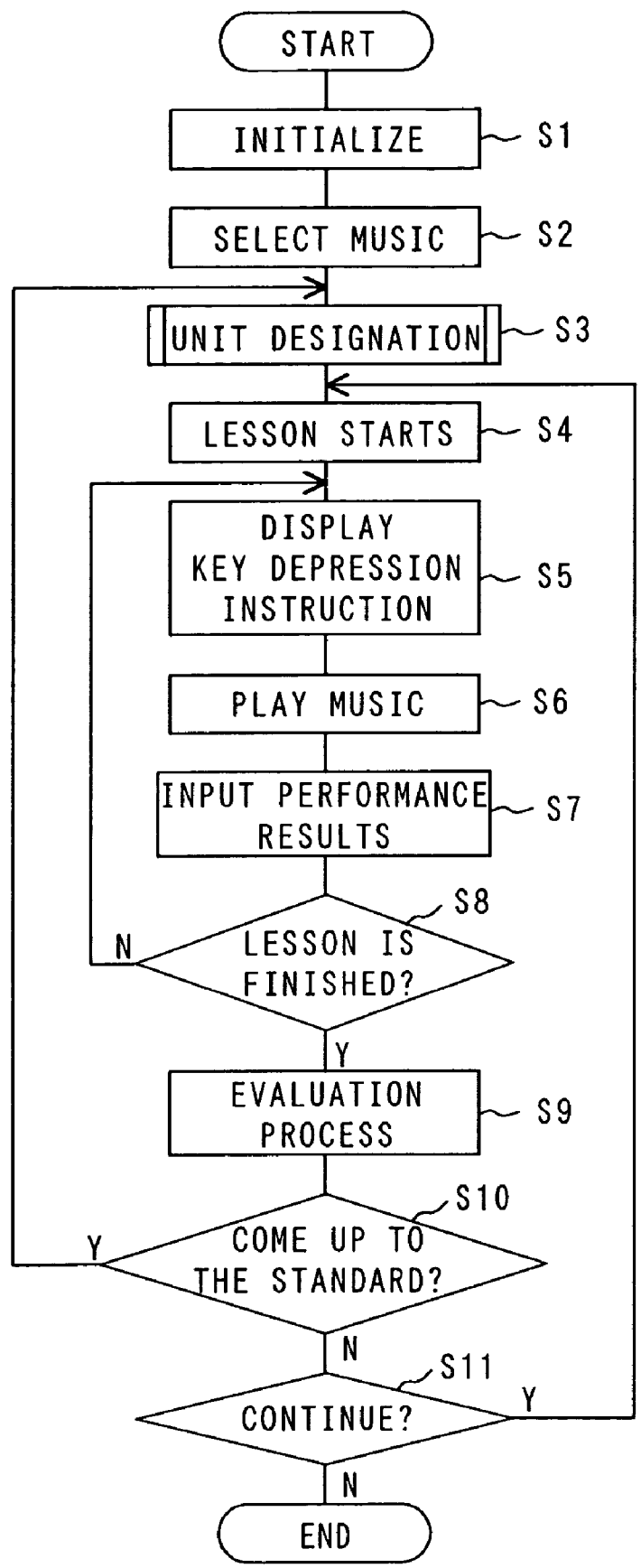
FIG. 4 is a flowchart showing the operation of the musical performance self-training apparatus.

The processing by the musical performance self-training apparatus will be described, with reference to the flowchart. FIG. 4 is a main flowchart. In step S1, initialization of the PC 1 including clear of a VRAM, which stores image data for displaying an image on the display 14, and clear of timer counter is conducted. In step S2, a music is selected. For example, a list of music is displayed on the display 14, and the player selects one from the list, by operating the keyboard 12 and the mouse 13. After selection of the music, process proceeds to step S3, where a unit is designated. Designation of unit is for designating which part of the performance data of the selected music is a training object, and a lesson menu based on the performance data is displayed on the display 14, and the training unit is specified thereon. An example of the lesson menu in which a unit is set is shown in FIG. 3. Designation of the unit will be described later with reference to FIG. 5.

In step S4, the lesson is started. The lesson may be started automatically, or start instruction may be given by using the keyboard 12 and the mouse 13. In step S5, the key depression instruction is displayed on the display 14 according to the performance data. The display example of the key depression instruction will be described later with reference to FIG. 6.

In step S6, musical tones included in the performance data, that is, accompaniment and metronome sound are played. The played sound can be produced using the tone generator 24 and the sound system 22 in the keyboard instrument 2. In step S7, the performance results of the player, that is, the key depression time, the key release time, the velocity and the like are read in the PC 1, for evaluation of the performance and for advancing a pointer for reading the performance data for the key depression instruction. It is desired to perform the process of steps S5 to S7 by interrupting handling. When the pitch (represented by a note number) designated by the played performance data and the pitch (represented by a depressed key) in the performance result do not coincide with each other, reproduction of the performance data is not advanced to the next stage, that is, the pointer is not advanced.

In step S8, it is judged whether the lesson is finished. When performance for all of the performance data of the designated unit has finished, the judgment in step S8 becomes affirmative, and process proceeds to step S9. When the lesson is not finished, process proceeds to step S5.

In step S9, result processing or evaluation is performed. In the result processing, the performance result read in step S7, that is, the depressed key data is compared with the prepared performance data, and the result is judged according to the degree of coincident. The comparative contents include the length of the note (duration of key-on), the velocity, the key depression timing and the like, and the number of miss-touch, that is, the number of key depression in which different key from the designated key by key depression instruction is depressed may be compared with the number of the acceptable standard. In the result processing, the grade is determined based on the comparison results.

In step S10, as a result of the result processing, it is judged whether the performance of the designated unit by the player reaches the acceptable standard. If the unit has reached the acceptable standard, process proceeds to step S3, to provide a unit to be played next. In the case of nonacceptance, process proceeds to step S11, to judge whether the training is to be continued. This judgment can be made based on the existence of instruction by the player, using the keyboard 12 and the mouse 13. If the training is to be continued, process proceeds to step S4.

Figure 5:
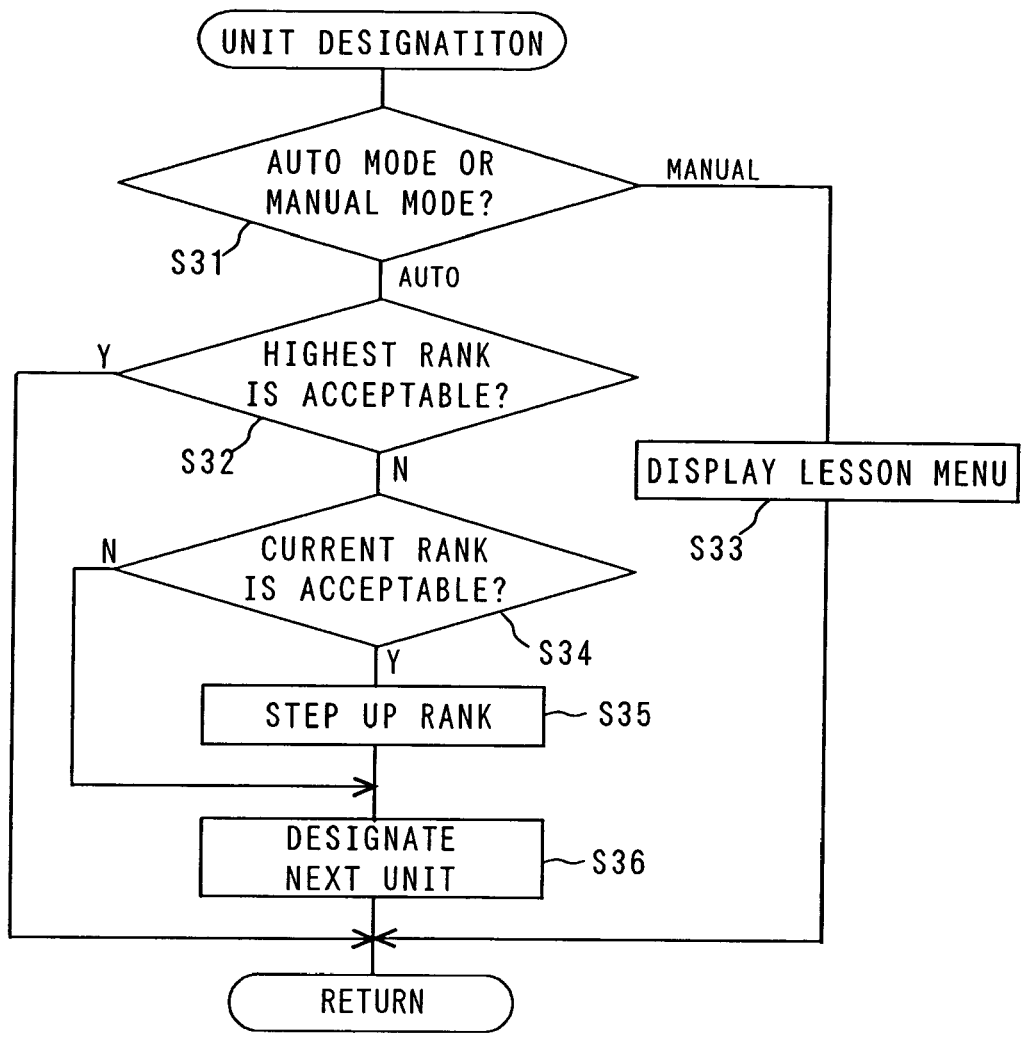
FIG. 5 is a flowchart showing unit designation processing.

FIG. 5 is a flowchart for designating a unit (step S3). In step S31, it is judged whether designation process is executed by automatic mode or manual mode. An instruction information that instructs automatic designation or manual designation may be included in the performance data to omit giving an instruction operation to indicate automatic or manual. In the case of automatic mode designation, process proceeds to step S32, and in the case of manual mode designation, process proceeds to step S33, to display a lesson menu. In step S33, it is desired to display a message to call a player's attention for giving instruction, such as "Please designate a unit", on the lower part of the screen, together with the display of the lesson menu shown in FIG. 3. In the initial menu, the first unit in the lower most rank is designated. If the player likes it better as it is, the player inputs start instruction. When the player wants to change the initial menu, he or she designates a unit as desired by indicating the frame of unit on the menu by using the mouse 13 and the like. In step S5, the performance data is read according to the link information of the unit, and the key depression instruction is displayed corresponding to the performance data.

In the case of automatic designation, process proceeds from step S31 to step S32, to judge whether the performance for all units in the highest rank has come up to the passing mark. If the player has not passed the highest rank, process proceeds to step S34, to judge whether the performance of all units in the current rank is acceptable based on the unit result information. If this judgment is negative, process proceeds to step S36, to designate the training unit to be played next. For example, as shown in FIG. 3, the display is changed such that unit U2 is enclosed by a frame, and then process proceeds to step S4 (FIG. 4). If the judgment in step S34 is affirmative, process proceeds to step S35, to elevate the rank by one stage, and process proceeds to step S36. For example, when the rank is elevated by one stage from rank R5 to rank R4, in step S36 immediately thereafter, a unit consisting of the first four bars in rank R4 is designated. In this manner, when the player is passed the highest rank R1, the judgment in step S32 becomes affirmative, to finish the processing.

Figure 6:
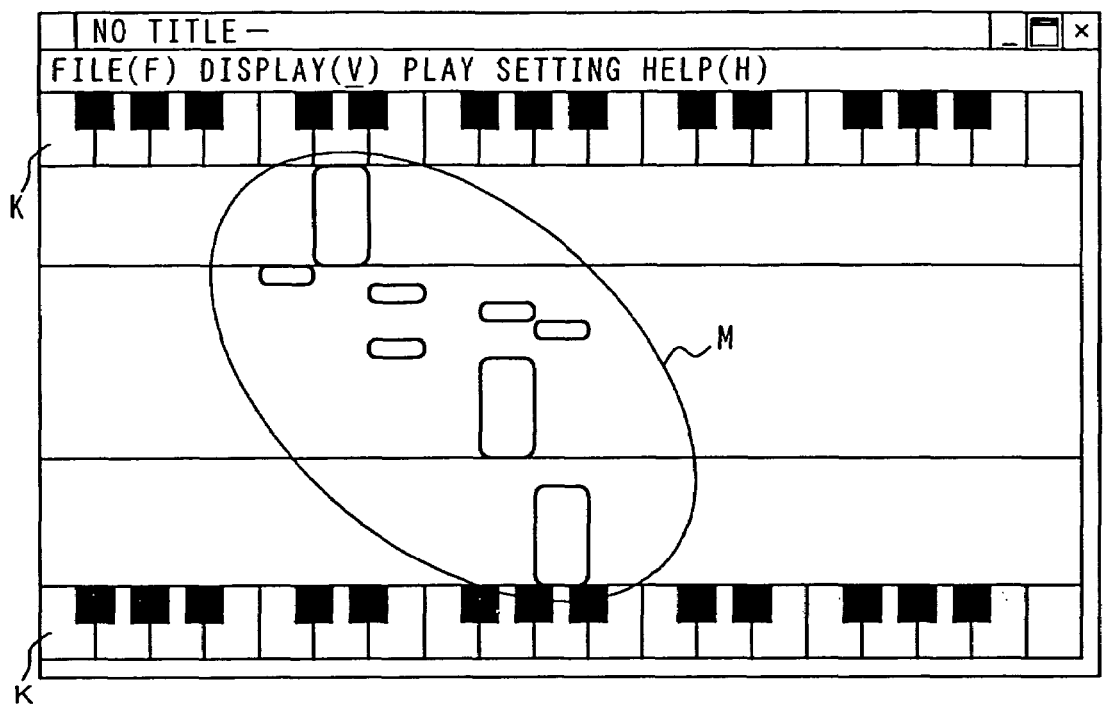
FIG. 6 is a diagram showing a display example of a key depression instruction.

FIG. 6 is a diagram showing one example of the key depression instruction displayed on the display 14 in step S5 shown in FIG. 4. In the FIG. 6, the keyboard figure is displayed on the upper part and the lower part of the screen. In order to make it easy to see to which key on the keyboard the key depression instruction corresponds, the keyboard figure K is displayed on upper and lower area of the screen, but this figure (FIG. 6) may be displayed only on the lower area of the screen. A plurality of substantially rectangular marks M having a length corresponding to a length or a vertical size of the note, and a width of the white key in the keyboard figure K, and displayed between the keyboard figures K and K, is the key depression instruction. One mark corresponds to one note. On the display, the vertical direction indicates a time axis, and as the key depression instruction mark becomes closer to the lower keyboard figure K, it shows a note to be played at the earlier timing. The key depression instruction mark M moves downward at a predetermined tempo, and it is the timing to play the key immediately below the mark when the lower end of each key depression instruction mark M reaches the upper edge of the lower keyboard figure K. On the other hand, it is the key release timing of the key when a key depression instruction mark corresponding to the key now being depressed is scrolled downward and disappears from the screen. The movement, that is, scrolling of the key depression instruction mark is executed so that the key depression instruction mark for the note to be played next abuts against the upper edge of the lower keyboard figure, when the player plays the key as instructed. The scroll may start at the time of key release, instead of key depression.

As the display method of the key depression instruction, for example, one described in Japanese Patent Application No. 2001-352206 according to the application by the present applicant may be applied. Display of the key depression instruction is not limited to the scroll type in which musical parts are sequentially scrolled, and the entire music may be instructed at the same time, or scrolling or switching of the screen may be carried out so that the predetermined number of bars is displayed on one screen, to proceed the display forward. Moreover, when the key depression instruction is scrolled, the velocity thereof is optional, and may be according to the tempo of the music.

Figure 1:
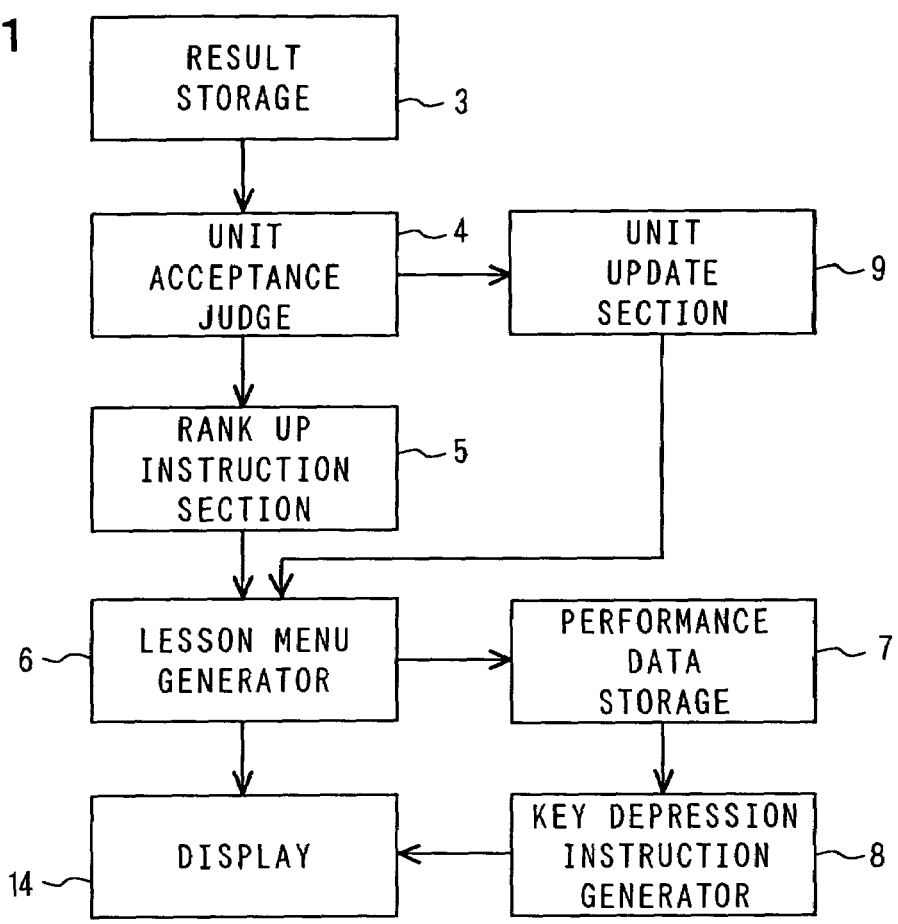
FIG. 1 is a block diagram showing the main function of a musical performance self-training apparatus according to the first embodiment of the present invention.

FIG. 1 is a block diagram showing the main function of the PC 1 for designating the unit. In this figure, the result information for a performance of the music related to each unit is stored in a result storage 3, every time the performance of each unit finishes. A unit acceptance judge 4 judges whether the performance of all units in the current rank reach the acceptable standard by comparing the information stored in the result storage 3 with the prepared standard performance data. When all the units which is performed are accepted, the judgment result is inputted to a rank-up instruction section 5. The rank-up instruction section 5 responds to the input judgment result, and outputs a rank-up instruction to a lesson menu generator 6. By this rank-up instruction, the lesson menu generator 6 generates data for displaying menu including designation of the first unit in the rank upper than the current rank by one stage as a unit to be played next, and the display 14 displays a lesson menu responding to the data provided by the lesson menu generator 6. For example, a unit to be played next is enclosed by a thick frame, as the unit U2 shown in FIG. 3.

The unit is designated on the lesson menu, and the performance data representing the score in the designated unit is read out from performance data storage 7 to a key depression instruction generator 8. The key depression instruction generator 8 generates key depression instruction information based on the performance data and outputs the information to the display 14, to display an image shown in FIG. 6.

When the unit acceptance judge 4 judges that only performance of a part of the units in the current rank is acceptable, the judgment result is input to a unit update section 9. The unit update section 9 responds to the input judgment result, and outputs a unit update instruction to the lesson menu display section 6. The lesson menu generator 6 outputs data having a designation where the unit subsequent to the currently designated unit is the unit to be played next, according to the unit update instruction. Since the unit having the same content is controlled collectively, at the time of updating the unit, the unit having the same musical tone information as that of the unit that has been accepted is not designated, and a unit to be played next is designated.

Figure 7:
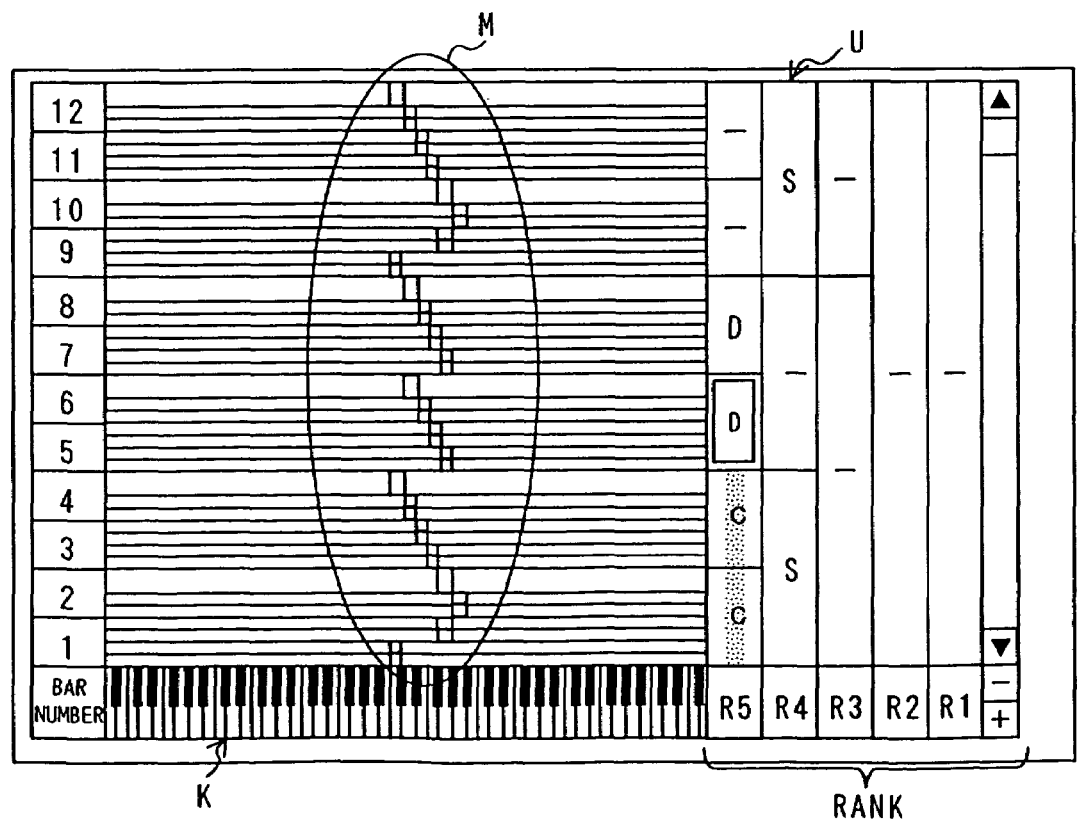
FIG. 7 is a diagram showing another display example of a lesson menu.

The display format of the lesson menu is not limited to the image corresponding to the score, as shown in FIG. 3. FIG. 7 is a diagram showing an example of the lesson menu, in a mode in which the score is represented by a keyboard figure and a mark corresponding to the keyboard figure (referred to as a piano roll view mode). The keyboard figure K is arranged in the lower part of the screen, and above this keyboard figure K, a time axis is elongated vertically, and a rectangular mark M having a length (size along to the time axis) corresponding to the length of the note is displayed. On the right side of this mark, a unit U for each rank is displayed.

In FIG. 7, there is shown an example in which the unit including the first to the fourth bars in rank R5 is performed acceptably, and the unit including the fifth to the eighth bars is performed unacceptably (grade D), and hence the unit consisting of the fifth and sixth bars is designated again.

In the above-described embodiment, the unit is designated such that when the performance of one unit is executed acceptably, the next bar is selected in the same rank to be played. However, the designating method is not limited to this, and the unit may be set so that the player can have continuous training for many bars at a stage as early as possible.

For example, in FIG. 3, when unit U1 and the unit adjacent to unit U1 are accepted, the next unit in the same rank is not designated next, but the rank is elevated by one and the first unit in the upper rank R4 may be designated. Since the first unit in rank R4 consists of the first two units in rank R5, relatively long performance can be experienced in rank R4 where training for these two units is performed in succession.

When the performance of the first unit in rank R4 is accepted, returning to rank R5 again, the third unit is selected. When the performance of this unit is accepted, the fourth unit in rank R5 is selected. When the performance of the fourth unit 20 in rank R5 is accepted, the second unit in rank R4 is selected. When the performance of the second unit is accepted, the first unit in rank R3 is selected. In this manner, when the performance of the unit in the lower rank included in one unit of the upper rank is accepted, training can be performed by proceeding to the upper rank in order to play longer bars of music.

The key depression instruction is set such that unless the key as instructed is not played, scroll is not carried out, in order to improve the skill level. However, in the highest rank R1, the skill level of the player should be improved. Therefore, even if the key is not played as the key depression instruction indicates, the key depression instruction information, that is, the mark may be scrolled. It is for enabling through training of the entire music.

The unit may not be fixed. The borderline between units set in the performance data is set to a size, which is considered to be desirable for many users. However, this setting may be difficult to play for some users. For example, when a player wants to practice for a long part at a stretch, if the unit is fixed, the player must have playing of a higher rank having a larger unit size. In such a case, if the player can change the borderline to change the size of the unit, only the length to be played at a stretch can be changed without changing the rank, which is preferable.

Moreover, when a unit is set in advance in the performance data, for example, it is easier to divide the unit by two bars mechanically. However, for example, in the case of a music starting with up beat (Auftakt), in which a break in performance does not exist in the bar line, a unit divided by the bar is inconvenient. In such a case, it is quite convenient if the borderline between units can be shifted.

Figures 8, 9:
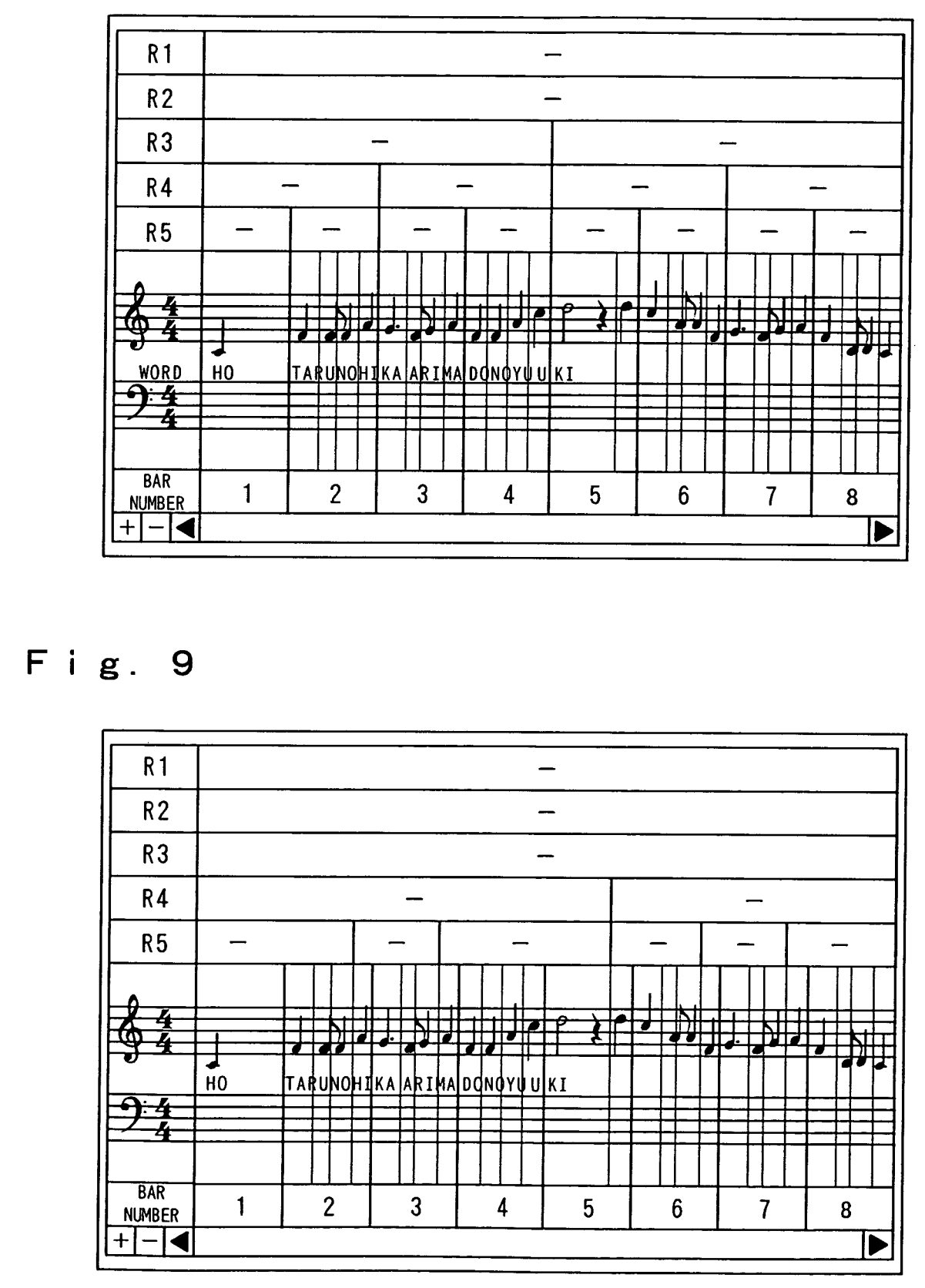

FIG. 8 is a diagram showing a setting example of units, which is not appropriate. This figure shows a music starting with an Auftakt or up beat (name of the song: Hotaru no Hikari in Japanese), and the units are set such that two bars simply constitute one minimum unit. This song is well known, and it can be considered that a beginner may practice while humming the lyrics. With the division of units shown in this figure, however, it does not correspond to the syllabic for Japanese pronunciation, such as "ho-ta-runo-" and "hi-kaa-ri-", and hence it is difficult to play. For a reference, lyrics (alphabetical notation of Japanese) is shown corresponding to the note in the figure.

Therefore, the borderline between units is reset, so that practice can be done by a unit division corresponding to the syllabic for Japanese pronunciation. In this manner, since the range to be played at a stretch corresponds to a unit, it becomes easy to practice especially for a beginner.

FIG. 9 is a diagram showing an example in which the borderline between units is reset. As described above, the division of units is changed, and the lesson menu is created so that playing according to the lyrics of "Hotaru no Hikari" is possible.

This example shows a simple up beat music, for easy understanding. Actually, however, there is various complicated music, and it is difficult to set the units fully appropriately automatically by a computer. Therefore, it is meaningful to have a function of resetting the division of units.

Figure 10:
FIG. 10 is a diagram showing an example of music in which the unit setting is to be changed.

FIG. 10 is a diagram showing a lesson menu of another music, in which it is desired to reset the units. In this music, a player must proceed to rank R1, in order to have continuous practice for the eighth and the ninth bars. Therefore, for example, in rank R4, a unit including the eighth and the ninth bars is set, so that the player can have practice for the eighth and the ninth bars continuously. In this manner, one playing range can be reset in the lower rank according to preference, thereby enabling effective practice.

In order to change the size of the unit, for example, a player specifies a borderline (vertical line for providing unit) between units which the player wants to shift by the mouse 13, and draws the borderline to an optional position. Other than this method, a borderline between units may be added newly, or an existing borderline may be deleted. In this case, the borderline is rounded off to a vertical line (a line roughly dividing for each one note) shown on the score. As the method for editing the line in the figure, a known drawing method with a computer can be employed.

When the unit is reset, the area for managing the result is also changed. For example, in an example shown in FIG. 10, when the eighth and ninth bars are designated as one unit, result management is performed for this unit.

In the above embodiment, an example in which the key depression instruction and lesson menu are displayed according to the performance data is shown. However, the performance data may be used as data for auto-playing. In this case, a switch for starting model reproduction is included in the lesson menu, and by instructing this switch by the mouse 13, model performance is performed according to the performance data included in the training part, that is, the designated unit. The model performance may automatically finish when the reproduction, that is, performance of the performance data in the unit has finished, or a switch for stopping the model reproduction may be provided in the lesson menu.

Moreover, the performance result can be listened and confirmed. In this case, a recording/reproduction switch is provided in the lesson menu, and the performance result is recorded in a memory in the PC body 11, and the recording result can be played. Model reproduction and reproduction of the performance result are performed, by using a sound unit connected to the keyboard instrument 21.

Figure 11:
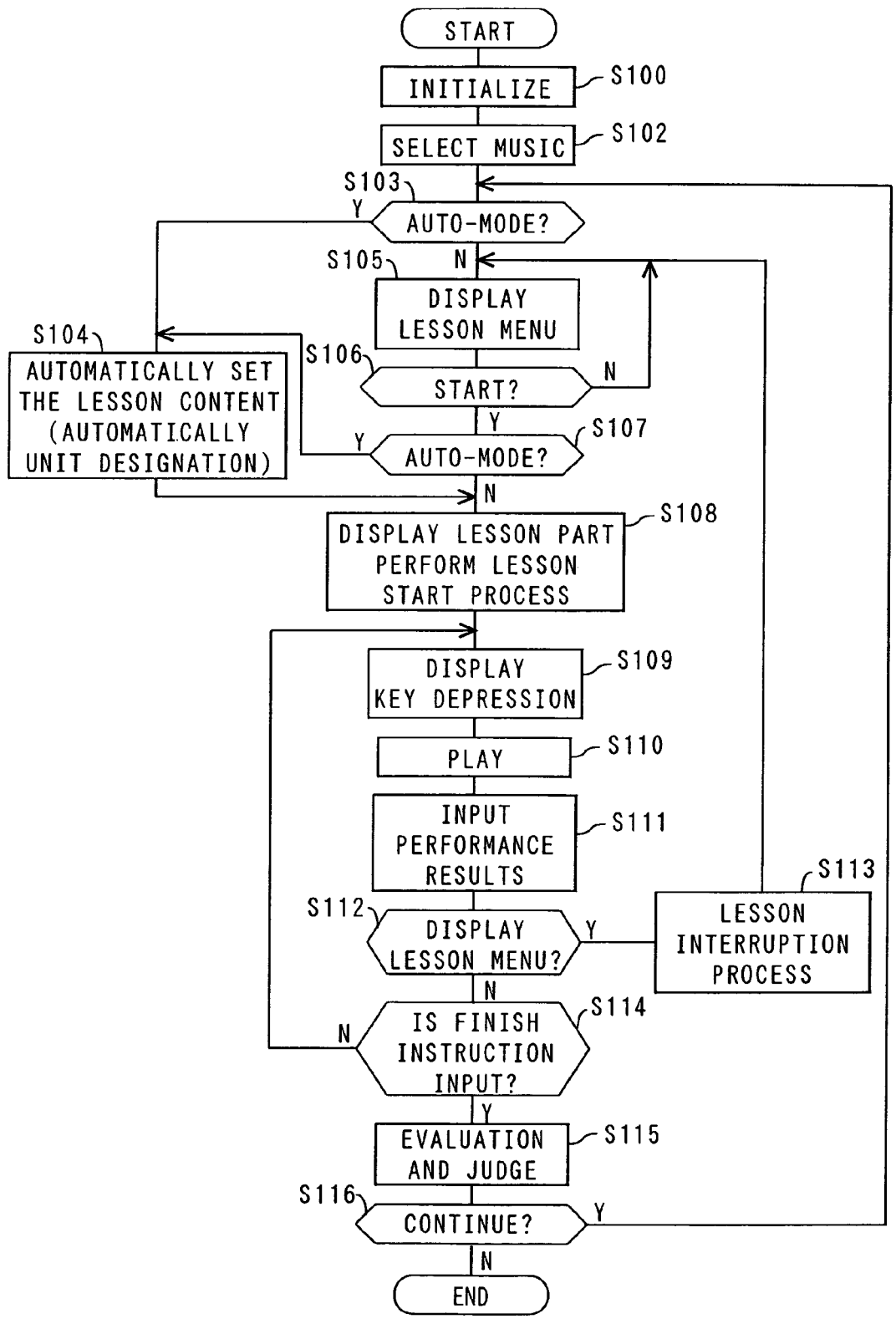
FIG. 11 is a flowchart showing the operation of the musical performance self-training apparatus according to a second embodiment.

FIG. 11 is a flowchart showing the second embodiment of this invention in which the designation of the unit can be changed while playing.

In the following description concerning to FIG. 11, same or similar operation is omitted to describe for avoiding repetition.

In step S103, it can be judged whether the training mode is the automatic mode or the manual mode based on the instruction information. An image for prompting an instruction of designation mode may be displayed on the display 14, so that a player can select the mode. In this case, the player can select the mode from the displayed selection image, using the keyboard 12 and the mouse 13.

When the automatic mode is instructed, process proceeds to step S104, to automatically set the lesson content. In other words, a unit for which the performance data is played is automatically set, according to the predetermined procedure. The automatic designation of unit has previously described in FIG. 5.

In the case of manual mode, control proceeds to step S105, to display the lesson menu shown in FIG. 3.

In step S106, it is judged whether a start instruction has been input. When the start instruction is given, process proceeds to step S107. An icon for start instruction may be included in the lesson menu. In step S107, it is judged whether the training mode is the automatic mode or the manual mode. When process proceeds to step S105 after interrupting the lesson to display the lesson menu, as described later, the mode setting is confirmed again here. If the unit designation mode is the automatic mode, process proceeds to step S104, or if the unit designation mode is the manual mode, process proceeds to step S108. In step S108, the designated unit is displayed in the lesson menu, then content or performance data of the unit is read out to start the lesson.

In step S109, a key depression instruction is displayed on the display 14 according to the performance data. An example of the key depression instruction has described previously in FIGS. 6 and 7. In step S110, notes included in the performance data, that is, accompaniment and metronome sound are played. In step S111, the performance results of the player are read in the PC 1 for judging the result. Steps S109 to S111 are executed similar to the step S5 to S7 of FIG. 4.

In step S112, it is judged whether the lesson is interrupted to display the lesson menu. In other words, even in the automatic mode, the lesson menu is displayed during training, by accepting the instruction to display the lesson menu, so that the player can designate a unit. If there is an instruction to display the lesson menu, instep S113, the lesson is interrupted, and the display of the key depression instruction information is stopped, to proceed to step S105.

When an instruction to display the lesson menu is not input during a predetermined stand-by time, process proceeds to step S114, to judge whether the lesson has been finished. When all of the performance data of the designated unit is played, the judgment in this step S114 becomes affirmative.

In step S115, the result processing is carried out. In the result processing, the performance result read in step S111, that is, the actual performance data, that is, depressed key data is compared with the performance data, and the result is decided according to the difference between them. The comparison is executed in relative to the length, the velocity and the tempo, and the number of miss-touch. The number of playing a key different from the designated key may be compared with the number in the acceptable standard. In the result processing, the rank is determined according to the comparison result.

As a result of the result processing, it is judged whether the performance of the unit has reached the acceptable standard. In step S116, it is judged whether to continue the lesson, based on the presence of instruction of the player input by the keyboard 12 and the like. If it is judged to continue the lesson, process proceeds to step S103. If there is no instruction to continue, this processing finishes. If there is the instruction to continue, and process returns to step S103, and when the performance has reached the acceptable standard, a unit to be played next is set, and when the performance has not reached the acceptable standard, the same unit is designated again.

While the lesson menu is displayed, the automatic mode or the manual mode can be instructed on the lesson menu. For example, in the automatic mode, when the player wants to display the lesson menu, in step S105, the player can select the mode, as well as designating the unit. When the manual mode is instructed, process proceeds from step S107 to step S108. When the unit is selected and the automatic mode is maintained as it is, process shifts from step S107 to step S104. When the unit is designated and process proceeds to step S104, the lesson in the automatic mode is started from the designated unit. When the unit designating mode is changed over from the manual mode to the automatic mode, the lesson is started from the current unit in the automatic mode.

When the lesson menu is displayed to designate a unit, while the key depression instruction is given in the automatic mode, it is possible not only to jump to a unit ahead, but also to designate a unit in which the playing has been performed and reached the acceptable standard, to improve the performance skill level until the player is satisfied. In this case, when the performance of the designated unit has finished, practice proceeds to a unit to be played at an earlier timing, of the units whose performance has not been conducted. The result is updated to the newest one.

Figure 12:
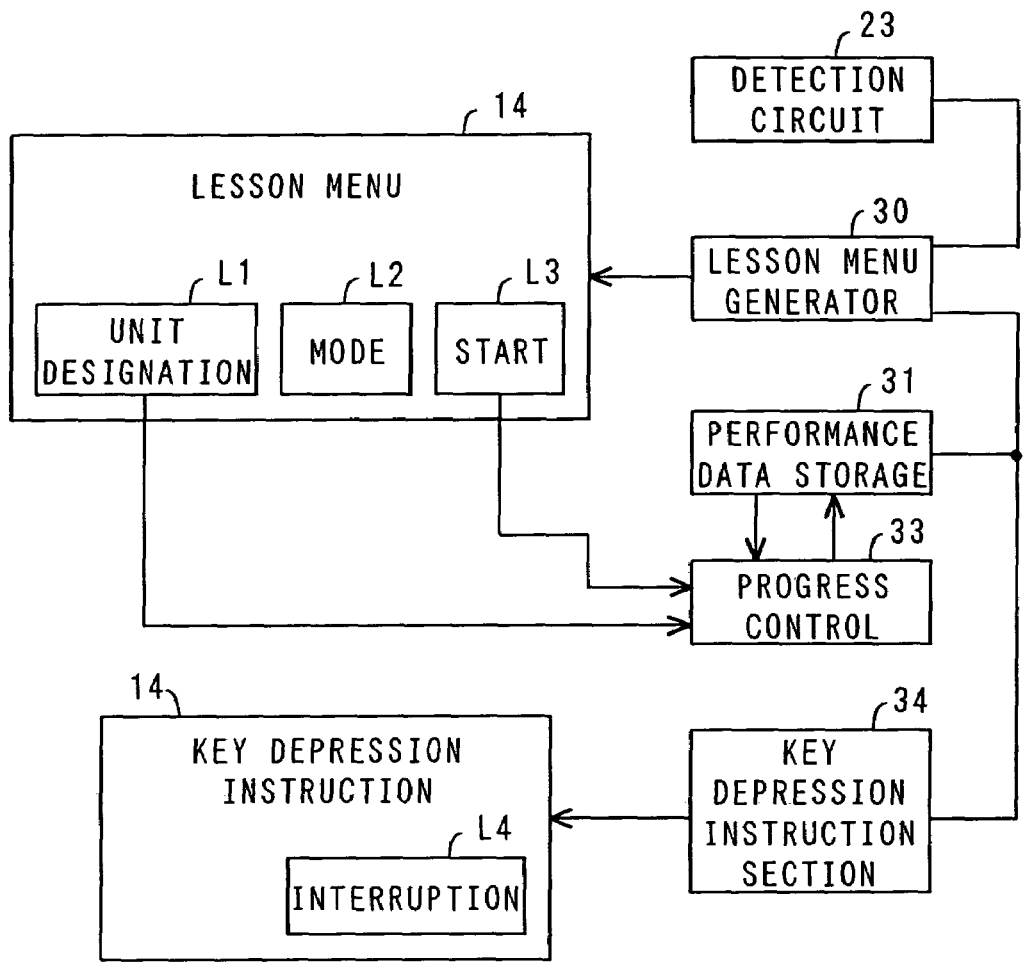
FIG. 12 is a block diagram showing the main function of a musical performance self-training apparatus according to a second embodiment of the present invention.

FIG. 12 is a block diagram showing the main function of the musical performance self-training apparatus according to the second embodiment of the present invention. In this figure, a lesson menu generator 30 generates a data for displaying the lesson menu as shown in FIG. 3. A performance data storage 31 stores performance data. The lesson menu generator 30 generates data for displaying the menu, by using the performance data and the key depression information detected by the detection circuit 23, and the menu is displayed on the display 14 according to the data supplied with lesson menu generator 30. The lesson menu includes a unit to be played next and the result of the played unit (grade and acceptance judgment), and various instruction switches (icon) are also displayed, such as a unit designation button L1, a mode switch L2, a start switch L3 and the like. For example, by indicating the mode switch L2 by the keyboard 12 or the mouse 13, the current unit designation mode is inverted. When the mode is the automatic mode, it is changed over to the manual mode, and when the mode is the manual mode, it is changed over to the automatic mode. The unit designation button L1 is displayed in the manual mode, and by indicating this button L1 by the keyboard 12 or the mouse 13, and instructing to display a desired unit, the unit to be played next is designated. The start switch L3 is provided for instructing start of the lesson after the unit has been designated.

When the start switch L3 is pressed, a progress control 33 reads out the performance data of the designated unit from the performance data storage 31, according to the instruction input with the unit designation button L1 and the designation of the unit, and inputs the performance data to a key depression instruction section 34. The key depression instruction section 34 displays the key depression instruction on the display 14, based on the input performance data.

When the key depression instruction is to be displayed, the lesson menu is deleted from the display 14, and when the lesson menu is to be displayed, the key depression instruction is deleted from the display 14. The lesson menu is displayed every time the performance of the designated unit is finished and evaluated, but a lesson interruption switch L4 is provided so as to correspond to a case where the player wants to display the lesson menu halfway through the performance. This lesson interruption switch (icon) L4 can be superimposed on the key depression instruction display. When the lesson interruption switch L4 is pressed, the key depression instruction displayed on the display 14 is replaced with the lesson menu.

Figure 13:
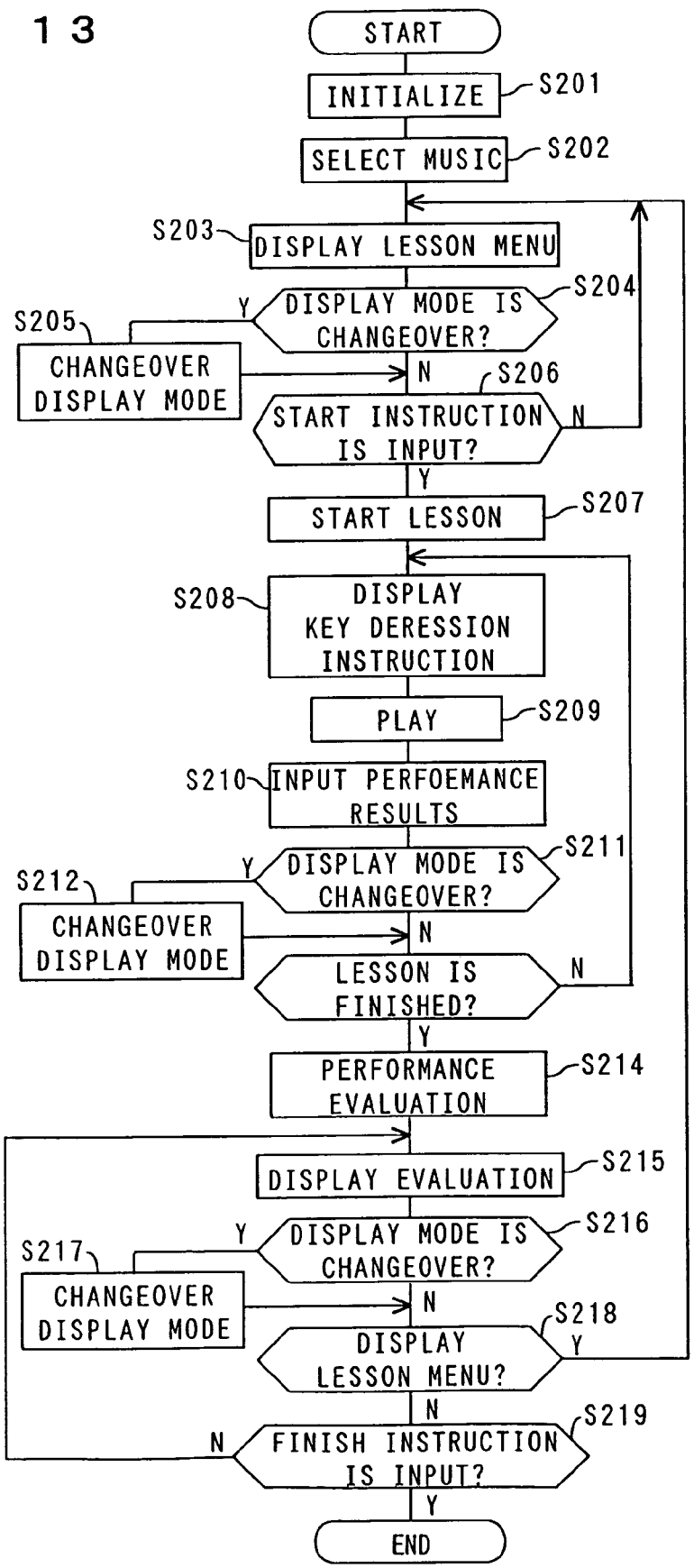
FIG. 13 is a diagram showing another display example of the lesson menu.

The key depression instruction can be displayed various pattern or mode. In an embodiment described below contains a means for displaying the key depression instruction for various modes to be selected by the player's choice. FIG. 13 is a flowchart showing the third embodiment of this invention.

In the following description related to FIG. 13, same or similar operation is omitted to describe for avoid repetition.

The performance data of the selected music at step S202 includes data for designating the key depression instruction display mode, other than the note information. The display mode is designated for each music.

When the music has been selected, process proceeds to step S203 to display a lesson menu on the display 14. The lesson menu is set such that one or a plurality of parts obtained by dividing performance data into a plurality of parts can be designated as one unit as described before. The designated unit can be extended stepwise corresponding to the progress of practice, that is, the parts included in the unit are increased, so that finally the entire music can be played at a stretch. The evaluation of performance can be displayed on the lesson menu for each unit. An example of the lesson menu has been described with reference to FIG. 4.

A display mode changeover icon switch is displayed together with the lesson menu, and the current display mode can be replaced with another display mode by operating this switch. In step S204, it is judged whether the changeover operation has been performed by the display mode changeover switch. If there is the changeover operation, process proceeds to step S205, to change over the key depression instruction display mode. The display mode can be changed over every time the changeover switch is operated periodically, for example, in order of piano roll view mode, score view mode and superimpose mode.

In step S206, it is judged whether a lesson start instruction is given or not. The lesson start instruction may be given by indicating the icon provided on the image displayed of the display 14, or may be input by the keyboard 12. If the lesson start instruction is given, process proceeds to step S207. It is possible to change the display mode, since process proceeds to step S203 until the lesson start instruction is input. If the display mode is not changed over, step S205 is skipped, and the current display mode is maintained.

In step S207, lesson start processing is performed. In step S208, the key depression instruction is displayed on the display 14 in the above-described display mode according to the performance data. In step S209, the musical sound included in the performance data, that is, accompaniment and metronome sound are played. The played sound can be produced using the tone generator 24 and the sound system 22 in the keyboard instrument 2. In step S210, the performance results of the player are input to the PC 1, for evaluation of the performance and for updating a pointer for reading the performance data for the key depression instruction. It is desired to perform steps S208 to S210 by timer interrupting processing.

In step S211 and step S212, processing relating to the changeover of the display mode by the display mode changeover switch is carried out, as in step S204 and step S205.

In step S213, it is judged whether the predetermined lesson has been finished, that is, reproduction of the performance data of the selected music has been finished. When all performance has finished according to the predetermined performance data, the judgment in step S213 becomes affirmative, and process proceeds to step S214.

In step S214, the performance result is evaluated. The performance is evaluated according to the incidence degree of performance result with the musical tone information in the performance data. The points to be evaluated include the pitch, the length and velocity, and key depression timing.

In step S215, the evaluation result is displayed on the display 14. The result display example will be described later with reference to FIG. 16 and FIG. 17. During this result displaying, the display mode can be changed. In other words, in step S216 and step S217, processing relating to the changeover of the display mode by the display mode changeover switch is carried out, as in step S204 and step S205.

In step S218, it is judged whether the lesson menu is to be displayed. The lesson menu display switch or icon forgiving instruction to display the lesson menu is displayed on the display 14 together with the result. When a training unit is designated, or the result of each unit is confirmed, the lesson menu display switch is operated. When the lesson menu display switch is operated, the judgment in step S218 becomes affirmative, and process proceeds to step S203. When the lesson menu display switch is not operated, process proceeds to step S219 to judge whether to finish the lesson. Instruction to finish the lesson can be displayed on the display 14 together with the result. If the instruction to finish the lesson is given, the processing in this flowchart finishes.

In this manner, the designation of the key depression instruction display mode included in the performance data can be changed, at any time of starting the lesson, during the lesson, and displaying the result.

When the key depression instruction display mode is changed, the key depression instruction display mode set in the performance data is updated by the changed key depression instruction display mode. Therefore, the key depression instruction when the music selected this time is again selected at the next time is displayed according to the key depression instruction display mode updated herein.

It is preset in the performance data which one of the two display modes of the lesson menu is to be used, like the key depression instruction display mode. However, the superimpose mode is not employed for the lesson menu.

Figure 14:
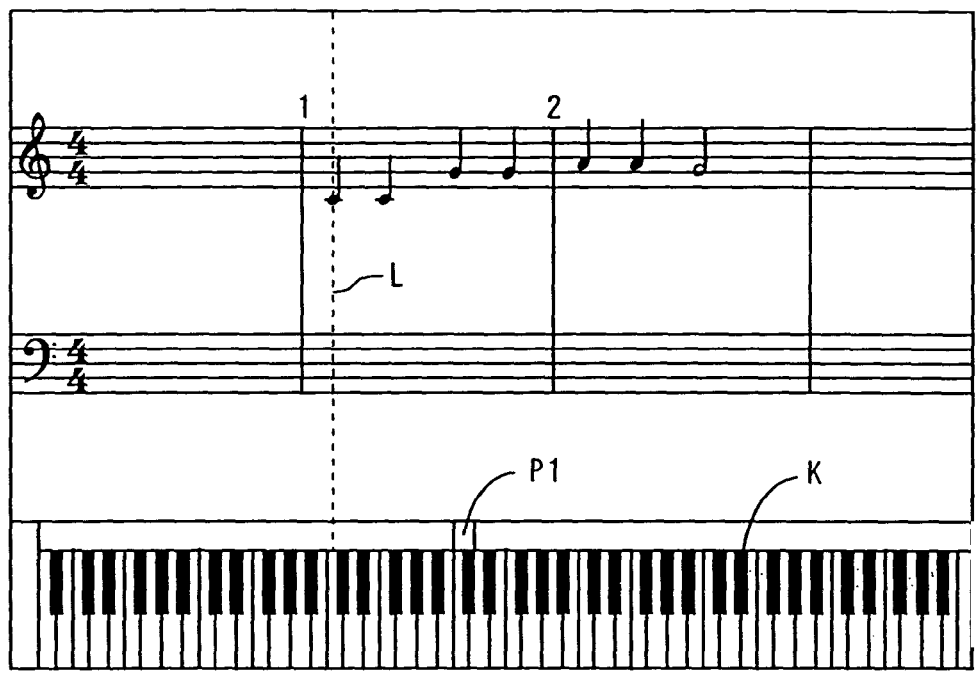
FIG. 14 is a diagram showing an example of key depression instruction in a score view mode.

FIG. 14 is a diagram showing an example in which the key depression instruction is displayed in the score view mode. The keyboard figure K is displayed on the lower part of the displayed picture. The keyboard figure K may be positioned on the upper and lower parts of the displayed image, in order to easily look at which key on the keyboard corresponds to the key depression instruction. The score is shown above the keyboard figure K, and the key depression timing is indicated by line L. The score is scrolled from the right to the left, and the note overlapping on the line L is the note to be played at present. The key corresponding to this note is indicated by mark P1.

The score may be scrolled for one note, when a key is depressed as instructed, or the line L is shifted to the right until performance of one grace note finishes, and the screen may be scrolled by one bar, when the note included in one bar has been played at a pitch as instructed. The line L is also shifted so as to match with the scrolling.

Figure 15:
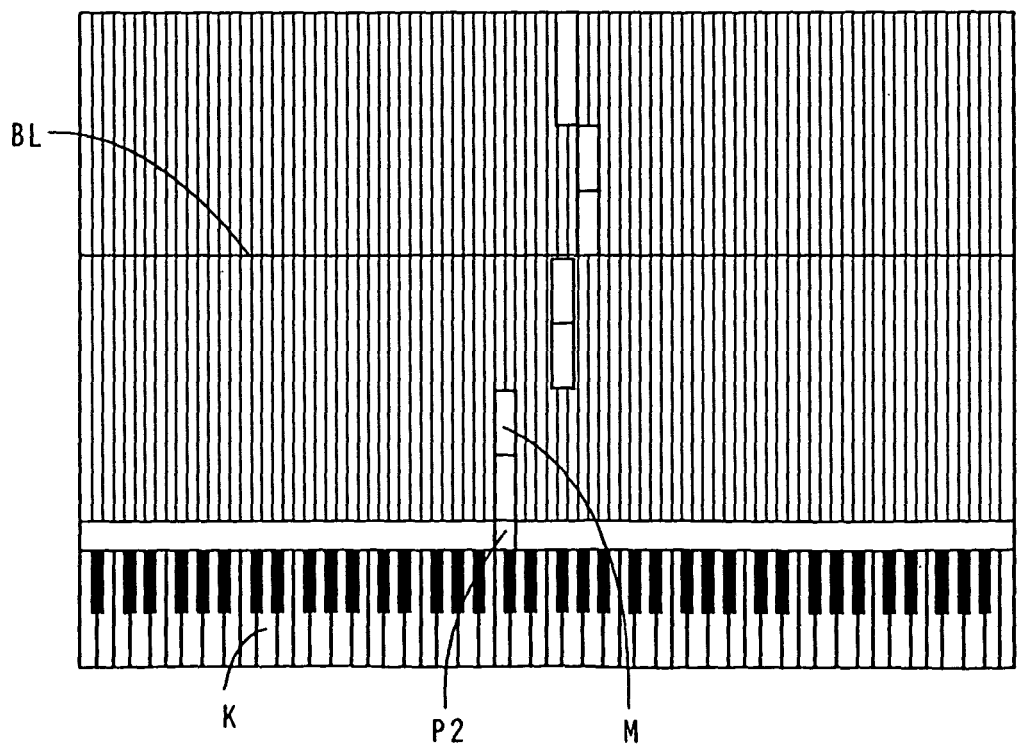
FIG. 15 is a diagram showing an example of key depression instruction in a piano roll view mode.

FIG. 15 is a diagram showing an example in which the key depression instruction is displayed in the piano roll view mode. The key depression instruction mark M is displayed corresponding to the key to be played according to the key depression instruction mark, above the keyboard figure K displayed on the lower part of the displayed image. Line BL is a bar line. In this example, the marks M included in two bars are displayed at the same time as one displayed image, but the size of the one image to be displayed at the same time can be preset. One key depression instruction mark M corresponds to one note, and each mark M has a length corresponding to the length of the note and a width of each key in the keyboard figure K. On the displayed image, the time axis is in the vertical direction, and the key corresponding to a key depression instruction mark closer to the keyboard figure K is a key to be played at the earliest timing. The mark M is scrolled downward. The key which is to be played now is indicated by mark P2.

Scrolling of the key depression instruction mark M is executed when the player has played the key as instructed. Scrolling may be performed at a key release timing. For the display of the key depression instruction, one disclosed in Japanese patent Application No. 2001-352206 according to the application by the present applicant can be applied. Display of the key depression instruction is not limited to the scrolling method, but the entire music may be indicated at the same time, or one displayed picture may be replaced with another one. When the key depression instruction is scrolled, the velocity thereof is optional, and may be according to the tempo of the music.

Figure 16:
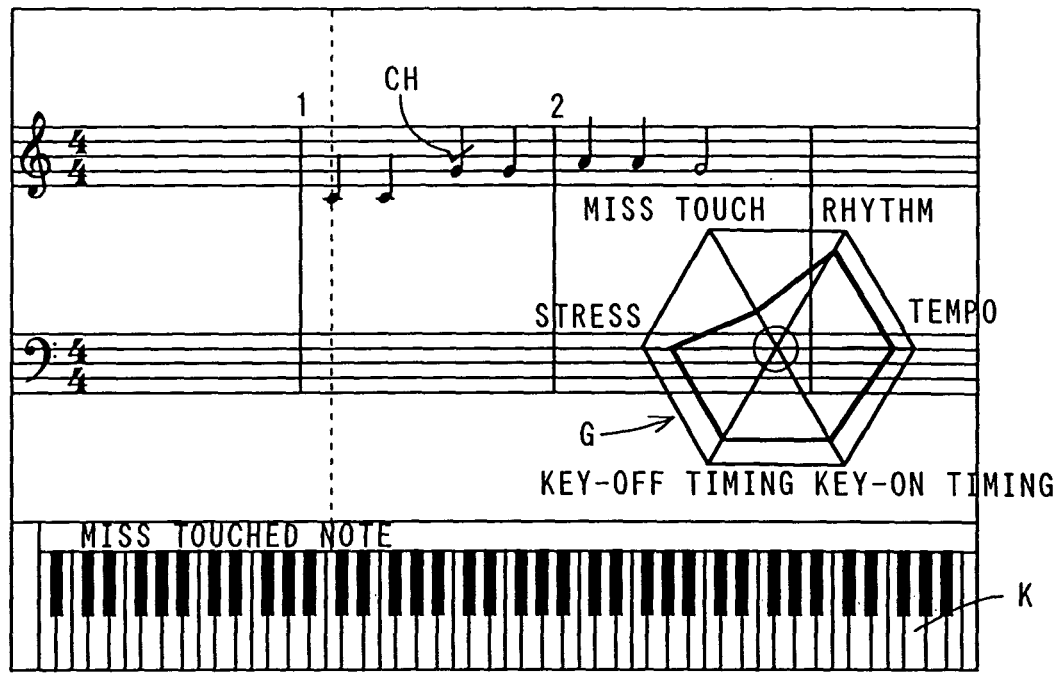
FIG. 16 is a diagram showing an example of key depression instruction in the score view mode, including result display.

FIG. 16 is a diagram showing an example in which the performance result is displayed in the score view mode, wherein the same reference symbol as that in FIG. 14 denotes the same or equal part. A check CH is written on the note having bad evaluation. Annotation corresponding to the check CH, that is, the key depression having bad evaluation is described above the keyboard figure K. In the case of the picture shown in FIG. 16, it can be understood that a key with the check CH has been miss-touched by the annotation.

Moreover, for easy understanding of the performance result of the player, evaluation for a plurality of elements is shown by the graph G. The judging elements for evaluation include miss-touch, rhythmic sense, tempo, key-on timing, key-off timing and stress (strong or weak) expression.

Figure 17:
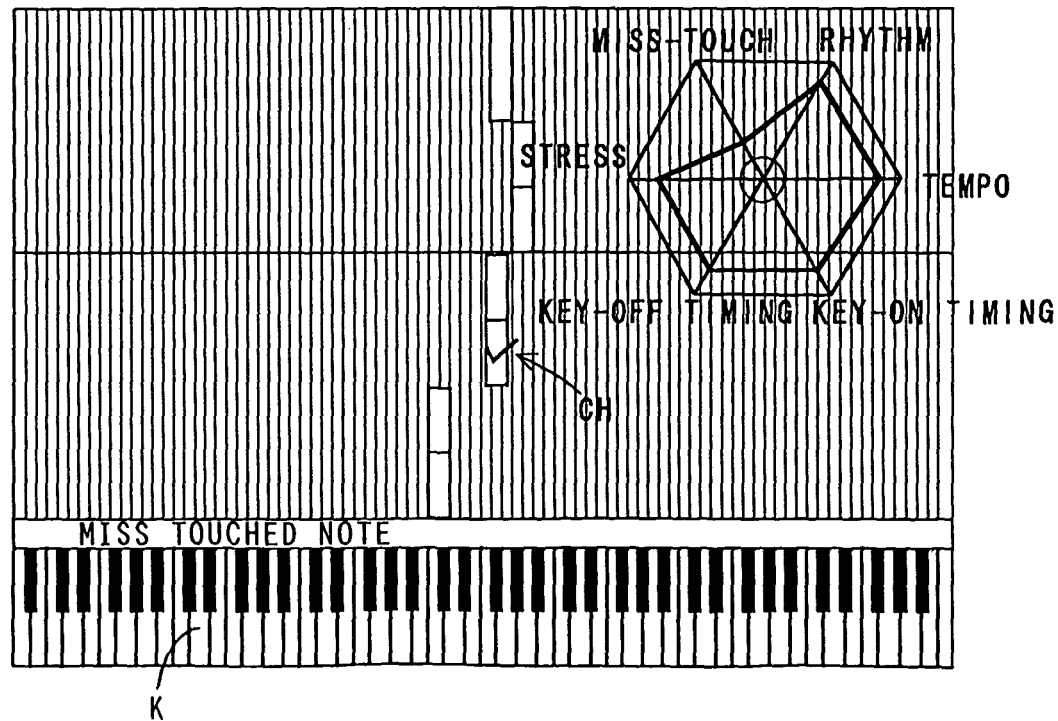
FIG. 17 is a diagram showing an example of key depression instruction in the piano roll view mode, including result display.

FIG. 17 is a diagram showing the result in the piano roll view mode in which the evaluation graph is superimposed pn the key depression instruction, wherein the same reference symbol as that in FIG. 15 denotes the same or equal part. Evaluation same as that in FIG. 16 is shown.

Figure 18:
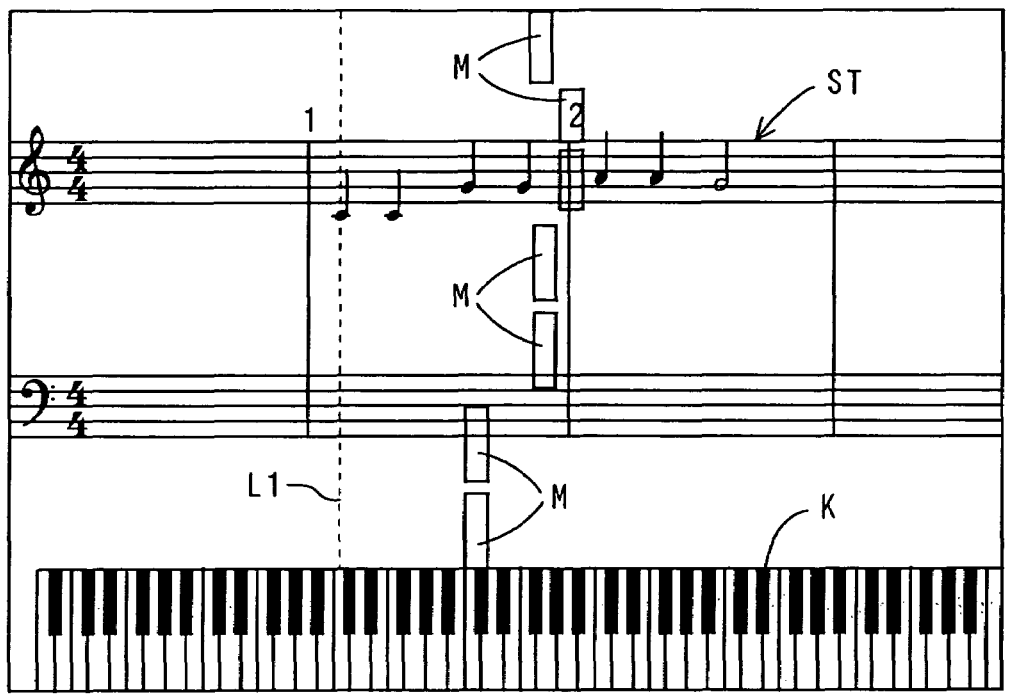
FIG. 18 is a diagram showing an example of key depression instruction in a superimpose mode.

FIG. 18 is a diagram showing a key depression instruction display example in which the display in the piano roll view mode is superimposed on the display in the score view mode. The length of the note displayed in the score view mode can be visually understood in the piano roll view mode. By comparing the displays in the both modes, even a beginner who cannot read the score can understand the meaning of the sign or note on the score, and can understand how to play according to the sign and note.

Figure 19:
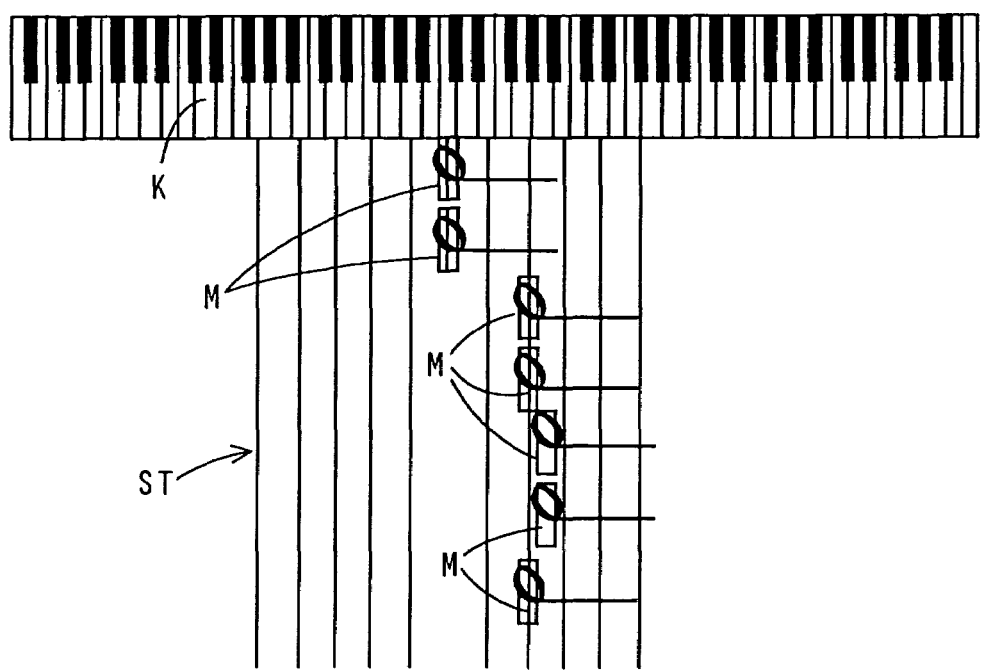
FIG. 19 is a diagram showing another example of key depression instruction in the superimpose mode.

FIG. 19 is a diagram showing another example of the superimpose mode. In this display mode, the keyboard figure K is arranged in the upper part, and the staff St is described corresponding to the keyboard figure K. The notes and the key depression instruction mark M are described on the staff ST. In this manner, since the staff ST is displayed longitudinally so as to correspond to the keyboard, the relation between the key position and the staff can be understood, and hence the relation between the note to be played and the key can be well understood.

The keyboard figure K is displayed long sideways, linked with the actual playing posture, but when priority is given to the arrangement of the known staff, the keyboard figure K may be arranged longitudinally. Moreover, also in the superimpose mode, the performance evaluation may be displayed together.

Figure 21:
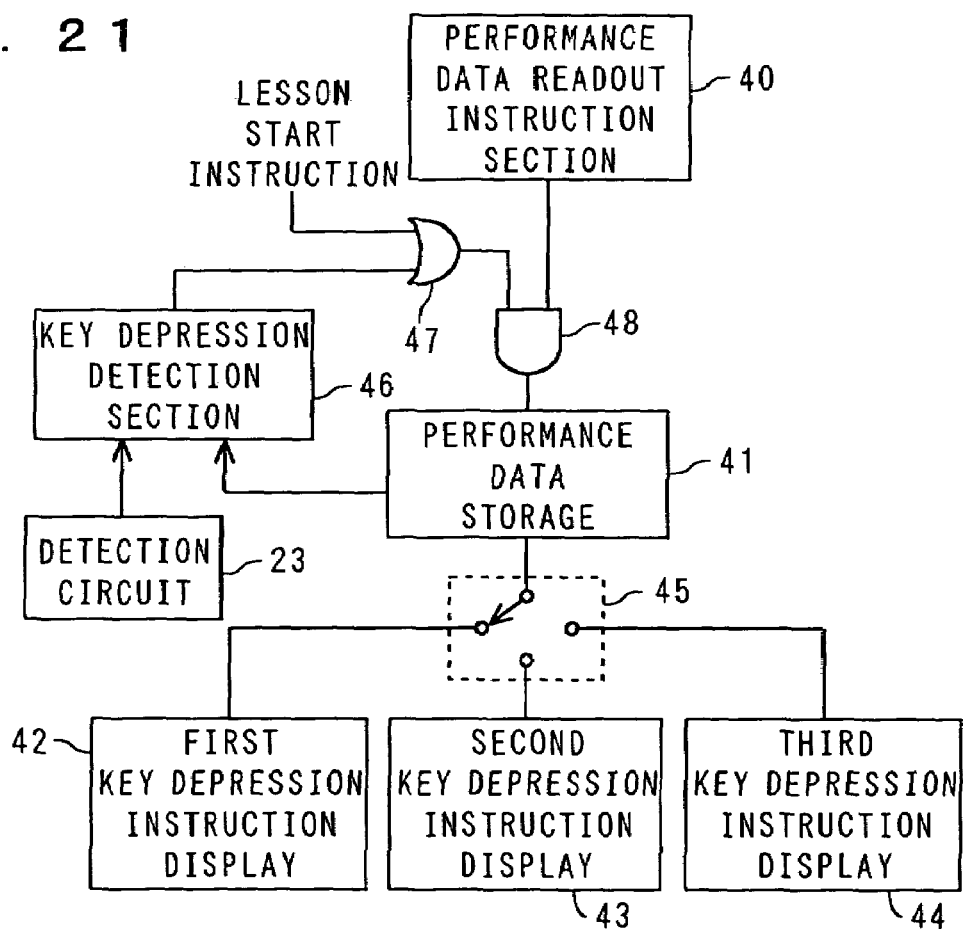
FIG. 21 is a block diagram showing the main function of a musical performance self-training apparatus according to the third embodiment of the present invention.

FIG. 21 is a block diagram showing the main function for changing over the key depression instruction display mode. A performance data readout instruction section 40 outputs a readout command to a performance data storage 41 responding to a lesson start instruction or key depression at a correct pitch. In response to the readout command, the performance data storage 41 outputs event data and timing data. The performance data is read out in order of from the top. The performance data is input by any one of a first key depression instruction display section (score view mode display section) 42, a second key depression instruction display section (piano roll view mode display section) 43, and a third key depression instruction display section (superimpose mode display section) 44, corresponding to the condition of the changeover section 45, which is changed over according to the instruction input by the player. Moreover, note data, that is, data indicating the pitch, of the event data, is also input to a key depression detection section 46.

The key depression detection section 46 compares the depressed key data detected by the detection circuit 23 with the note data, and outputs a detection signal when it detects that the correct key has been played. A first gate (OR) 47 opens to inputs the detection signal to a second gate (AND) 48, when the lesson start instruction is input, or the detection signal is input, and in response thereto, a readout command is input to the performance data storage 41.

Every time the key depression detection section 46 detects that the correct key has been played as instructed, the next performance data is read out to the first to the third key depression instruction display sections 42 to 44, and the key depression instruction is displayed in the predetermined respective modes, based on the input performance data.

In the above embodiment, three display modes are changed over and used, but the present invention is not limited thereto, and it is only necessary that at least either one of the score view mode and the piano roll view mode can be selected and used.

Figure 22:
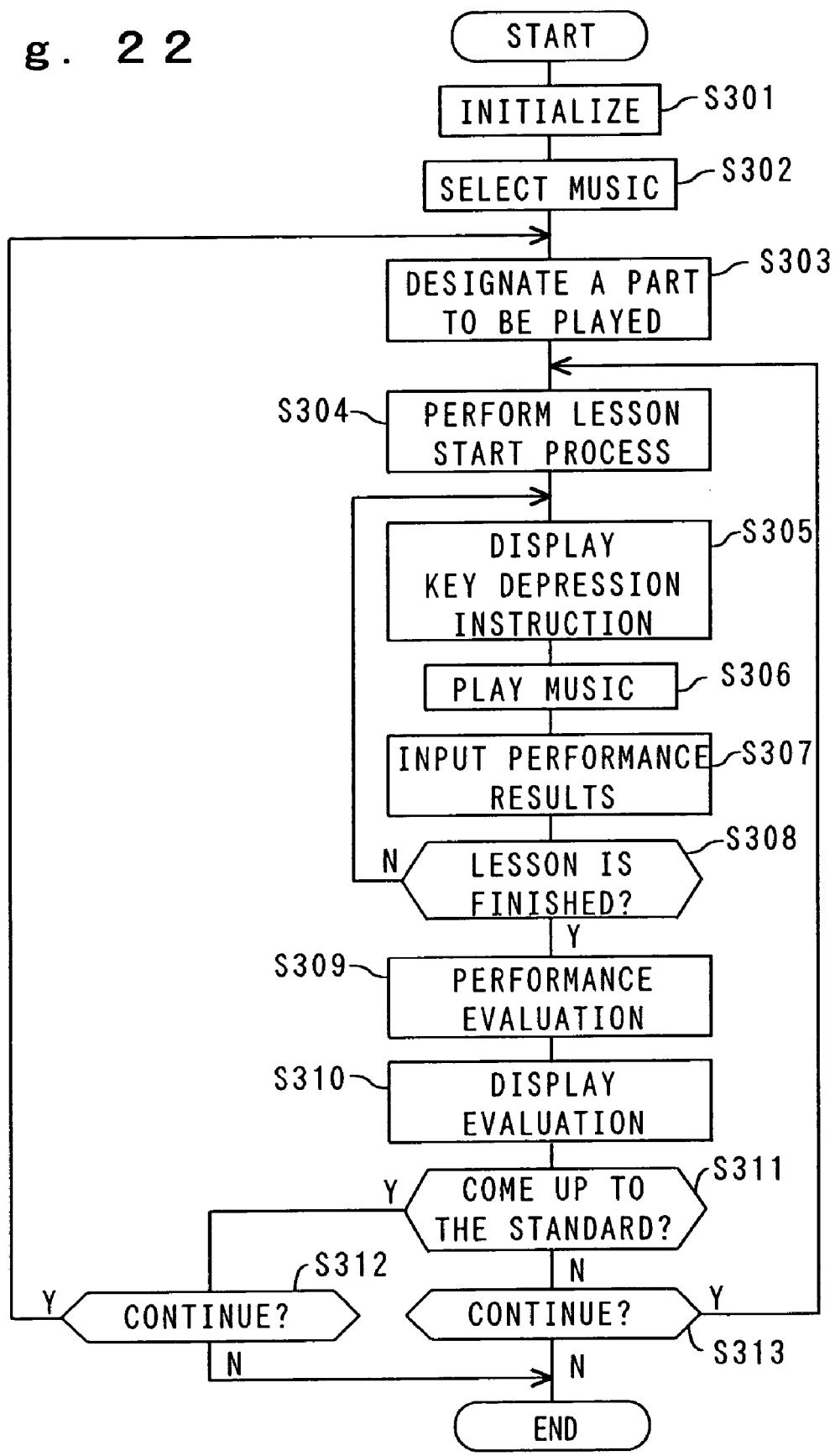
FIG. 22 is a flowchart showing the operation of a musical performance self-training apparatus according to the fourth embodiment of the present invention.

FIG. 22 is a flowchart showing the fourth embodiment of this invention. In order to avid repetition of description, main portion of the embodiment is described below, referring to FIG. 22.

The performance result fetched into the PC body 1, then is written in a memory such as a RAM. The pitch in the performance result is compared with the performance data one by one, and when the instructed pitch in the performance data coincides with the pitch in the performance result, reproduction of the performance data proceeds forward, thereby to advance the performance instruction. However, when the both pitches do not coincides with each other, reproduction of the performance data cannot proceed forward. The performance result in which the pitch does not coincides with the pitch in the performance data is overwritten with the new data, that is deleted, at the point in time when the performance result in which the pitch coincides with the pitch in the performance data is fetched. Steps S5 to S7 are carried out by timer interrupting processing.

Instep S308, it is judged whether the lesson has finished. When performance for all of the performance data of the designated unit has finished, that is, when the data ends, the judgment in step S308 becomes affirmative, and process proceeds to step S309. When the lesson has not finished, process proceeds to step S305.

In step S309, result judgment is performed. In the result judgment, the performance result read in step S307, that is, the actual key depression result by the player is compared with the performance data, and the result is judged according to the degree of agreement. The comparative contents include the key-on time, the key-off time and the velocity. Since only the performance result whose pitch coincides with the instructed pitch is stored, the pitch is not included in the result judgment. The agreement with the pitch is a premise of the results to be judged here. However, when a note is played at a pitch different from the instructed pitch, it is counted as a miss-touch, compared with the number in the acceptable standard and reflected in the result judgement. By these comparison results, the tempo evaluation, on-timing evaluation, off-timing evaluation, rhythm evaluation, volume evaluation, and miss-touch evaluation are individually performed, and the rank S to D is determined based on the comprehensive judgment. These evaluation items are one example only, and evaluation may be performed more finely, or may be performed with respect to fewer items.

In step S310, the result of performance evaluation is displayed. The rank may be displayed on the lesson menu, and the comprehensive evaluation obtained by integrating the individual evaluations may be superimposed on the key depression instruction display by using a graph, separately from the rank display. In step S311, as a result of the result judgment, it is judged whether the unit has come up to the acceptable standard. If the unit has come up to the acceptable standard, process proceeds to step S303, to designate a unit to be played next. If the performance of the unit has been passed in the judgement, process proceeds to step S312 to judge whether to continue the lesson. If the lesson is to be continued, process proceeds to step S303. On the other hand, when the performance of the unit has not been passed in the judgement, process proceeds to step S313 to judge whether to continue the lesson. The judgment of continuation of the lesson can be performed based on the existence of the lesson continuation instruction from the player by using the keyboard 12 or the like.

FIG. 23 is a diagram showing one example of the performance data. The performance data is compared with the performance result in the progress judgment of the key depression instruction for each key depression, and in the result judgment at the time of finishing the performance of the designated part. In this figure, the note number (provided in MIDI standard), model key-on time, model key-off time and model velocity are set with respect to the instructed keys A1 to AN arranged in the order of performance.

FIG. 24 is a diagram showing one example of the performance results stored in the memory or storage. The input key-on time, input key-off time and input velocity are written in the memory, relating to the depressed keys B1 to BN with respect to the instructed keys A1 to AN. The performance result is written for each tone in real time. When music is played with a tone where a pitch is different from the pitch of the model note number, it is counted as a miss-touch, and the number of miss-touches (input errors) is written for each playing.

FIG. 25 is a diagram showing one example of sub-evaluation, which becomes the grounds for the comprehensive evaluation. In this figure, the tempo ratio stands for a value of ratio between the time from the model key-on time of the instructed key A1 to the model key-off time (which may be the model key-on time) of the instructed key AN, and the time from the input key-on time of the depressed key B1 to the input key-off time (which may be the input key-on time) of the depressed key BN. In other words, the tempo ratio is an index indicating how much the actual performance time is longer than the model performance time, or how much the actual performance time is shorter than the model performance time.

An adjusted key-on time and adjusted key-off time stand for a value obtained by dividing the input key-on time and the input key-off time by the tempo ratio, respectively. In other words, these are values obtained by expanding or contracting the input key-on time and the input key-off time according to the tempo ratio, so that the key-on time by the performance data and the actual key-on time can be compared with each other.

Key-on timing evaluation is the evaluation corresponding to a difference between the model key-on time and the input key-on time, and key-off timing evaluation is the evaluation corresponding to a difference between the model key-off time and the input key-off time. Evaluation in the range of from 1 to 5 is given according to the difference.

Step time evaluation is the evaluation judged by comparing the step time with the model step time. By this step evaluation, it can be evaluated whether the pause between two tones has been taken well.

Gate time evaluation indicates a value judged by comparing the key-on duration, that is, the time from the input key-on time to the input key-off time with the time from the model gate time.

Adjusted key-on evaluation, adjusted key-off evaluation, adjusted step time evaluation and adjusted gate time evaluation are expanded and contracted values, obtained by respectively performing the similar evaluation to the input key-on timing evaluation, input key-off timing evaluation, step time evaluation and gate time evaluation.

Figures 26, 27:
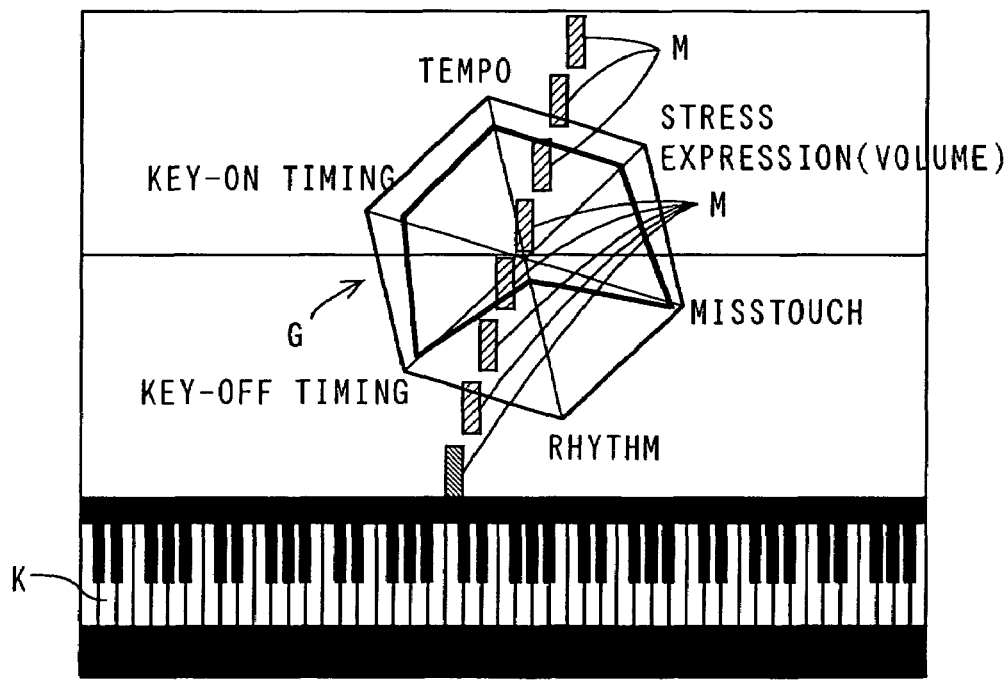
FIG. 26 is a diagram showing one example of the comprehensive evaluation based on the sub-evaluation.
FIG. 27 is a diagram showing one example of a displayed image, on which a graph showing the comprehensive evaluation is displayed on a key depression instruction display.

FIG. 26 is a diagram showing one example of the comprehensive evaluation based on the sub-evaluation. The comprehensive evaluation is obtained by comprehensively judging the tempo, key-on timing, key-off timing, rhythm, sound volume and miss-touch for tones corresponds to all depressed keys. For the tempo evaluation, higher evaluation is given as the tempo ratio is closer to "1". The key-on timing evaluation is a value obtained by determining the highest value of the key-on timing evaluation, step time evaluation, adjusted key-on evaluation and adjusted step time evaluation, for each tone number relating to the tone corresponds to the depressed keys B1 to BN, and averaging the highest values thereof.

Similarly, the key-off timing evaluation is a value obtained by determining the highest value of the key-off evaluation, gate time evaluation, adjusted key-off evaluation and adjusted gate time evaluation, for each tone relating to the depressed keys numbers B1 to BN, and averaging the highest values thereof.

Rhythm evaluation becomes higher, as there are more expanded and contracted key-on evaluations having come up to the acceptable standard. Moreover, volume evaluation becomes higher, as the difference between the model velocity and the input velocity becomes smaller. Miss-touch evaluation becomes higher, as the number of miss-touches decreases.

The above evaluation is divided into five grades, but the division of evaluation is not limited thereto, and for example, evaluation may be made out of a hundred, or three-grade evaluation may be made.

FIG. 27 is a diagram showing one example of key depression instruction display including a graphic display of the comprehensive evaluation. In this figure, a keyboard figure is displayed on the lower part of a displayed image. In order to make it easy to look at which key on the keyboard the key depression instruction corresponds, the keyboard figure K may be displayed also on the upper part of the displayed image. Rectangular key depression instruction marks M having a long side representing the length of the tone and a narrow side having the same length as the width of the key in the keyboard figure K are displayed above the keyboard figure K. One key depression instruction mark M corresponds to one tone. Here, key depression instruction marks for two bars are displayed. On the displayed image, the vertical direction corresponds to a time axis, and the key depression instruction mark M closest to the lower keyboard figure K indicates the key to be depressed at the earliest timing. The key depression instruction mark M moves downward sequentially, and a key corresponding to the key depression instruction mark M whose lower end has reached the lower keyboard figure K is the key to be depressed next. Scrolling of the key depression instruction mark is executed when the player depress the key corresponding to a right pitch. However, the scroll timing is not limited thereto. For example, at the time of key-off, the key depression instruction mark M may be scrolled by one.

The comprehensive evaluation G is displayed together on the screen where the key depression instruction mark M is displayed. It is desired that the comprehensive evaluation be such that the ability of the player can be intuitively understood by the shape profile of a polygonal graph and a deviation of the central point, as in this figure, but the type of graph is not limited thereto. For example, by a bar chart, it can be easily recognized which evaluation element is the strong point or the weak point of the player.

Graphic display is not limited to use for representation of the comprehensive evaluation. For example, an optional item in the comprehensive evaluation is selected, and the evaluation for each key depression can be displayed for the selected item in a time-series line chart. Thereby, a problematic point in the process of progress of performance can be recognized. The displayed item may be selected by instructing it by the mouse 13 or the like on the displayed graph for the comprehensive evaluation. The graph may be displayed in a space where the key depression instruction mark M is not described, or may be displayed as another image separate from the key depression instruction image displayed.

Figure 28:
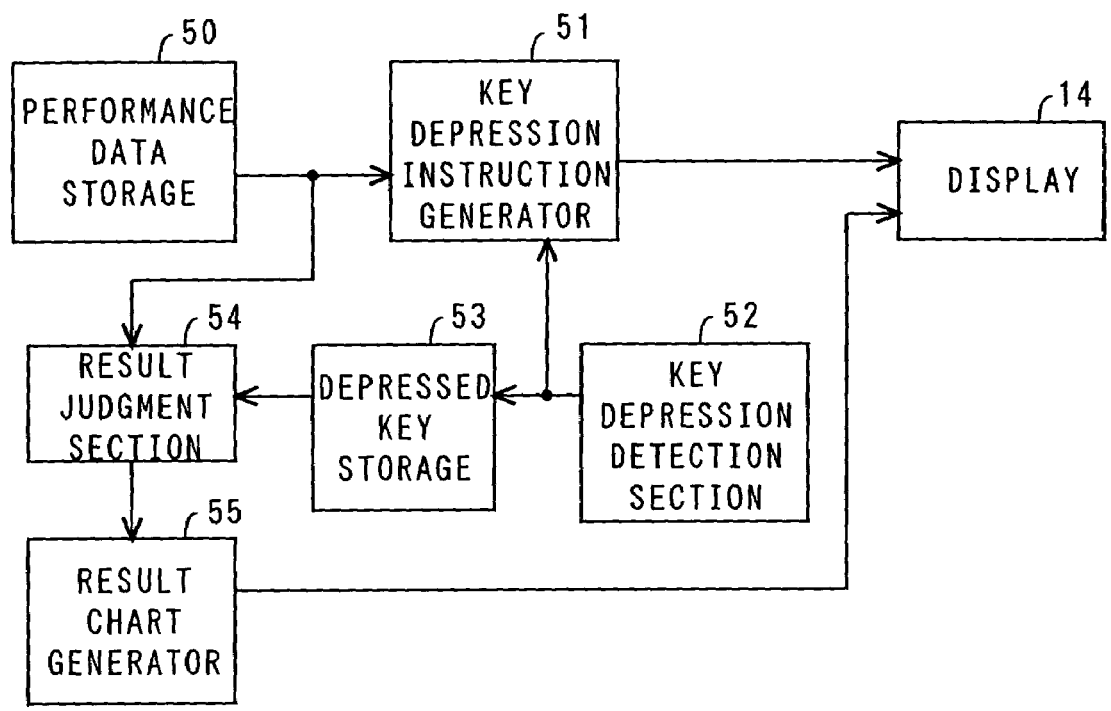
FIG. 28 is a block diagram showing the main function of the a musical performance self-training apparatus according to the fourth embodiment of the present invention

FIG. 28 is a block diagram showing the main function of the musical performance self-training apparatus related to the fourth embodiment. In this figure, performance data storage 50 stores performance data of music for performing the key depression instruction. A key depression instruction generator 51 generates information for displaying the key depression instruction according to the performance data. A key depression detection section 52 detects the depressed key number, key-on time, key-off time and the velocity, based on a detection signal of a sensor or a switch provided in the keyboard 21. When the depressed key number coincides with the note number in the performance data, the key depression instruction generator 51 reads out the performance data relating to the next tone from the storage 50, and updates the information for displaying the key depression instruction. The information for displaying the key depression instruction is output to the display 14 and the key depression instruction is displayed.

A depressed key storage 53 fetches the output data from the key depression detection section 52 and stores the data. A result judgment section 54 evaluates the performance by comparing the depressed key information stored in the depressed key storage 53 with the performance data. A result chart generator 55 creates a chart such as a graph based on the performance evaluation. The created chart is displayed on the display 14 together with the key depression instruction or separately.

The result judgment section 54 does not judge the result only by the fact that a note has not been played at the instructed pitch (it is the precondition of result judgment that notes are played at the instructed pitch), but evaluates the performance by comparing the information mainly relating to the performance timing, such as the overall performance time, key-on time, key-off time, gate time and step time, with the model data and the input data. Therefore, the player's ability can be evaluated in detail, and the grade can be determined based on the evaluation.

As described above, according to this embodiment, the player's ability can be specifically judged. Based on the judgment result, the evaluation standard can be changed. For example, ranks R1 to R5 have respectively different evaluation standard. If the evaluation standards of those ranks are linked with the evaluation result by the above-described evaluation method, the rank becomes adequate to any player. As a result, if the player has training sequentially from the lower rank, he/she can enhance the ability reasonably.

Figure 29:
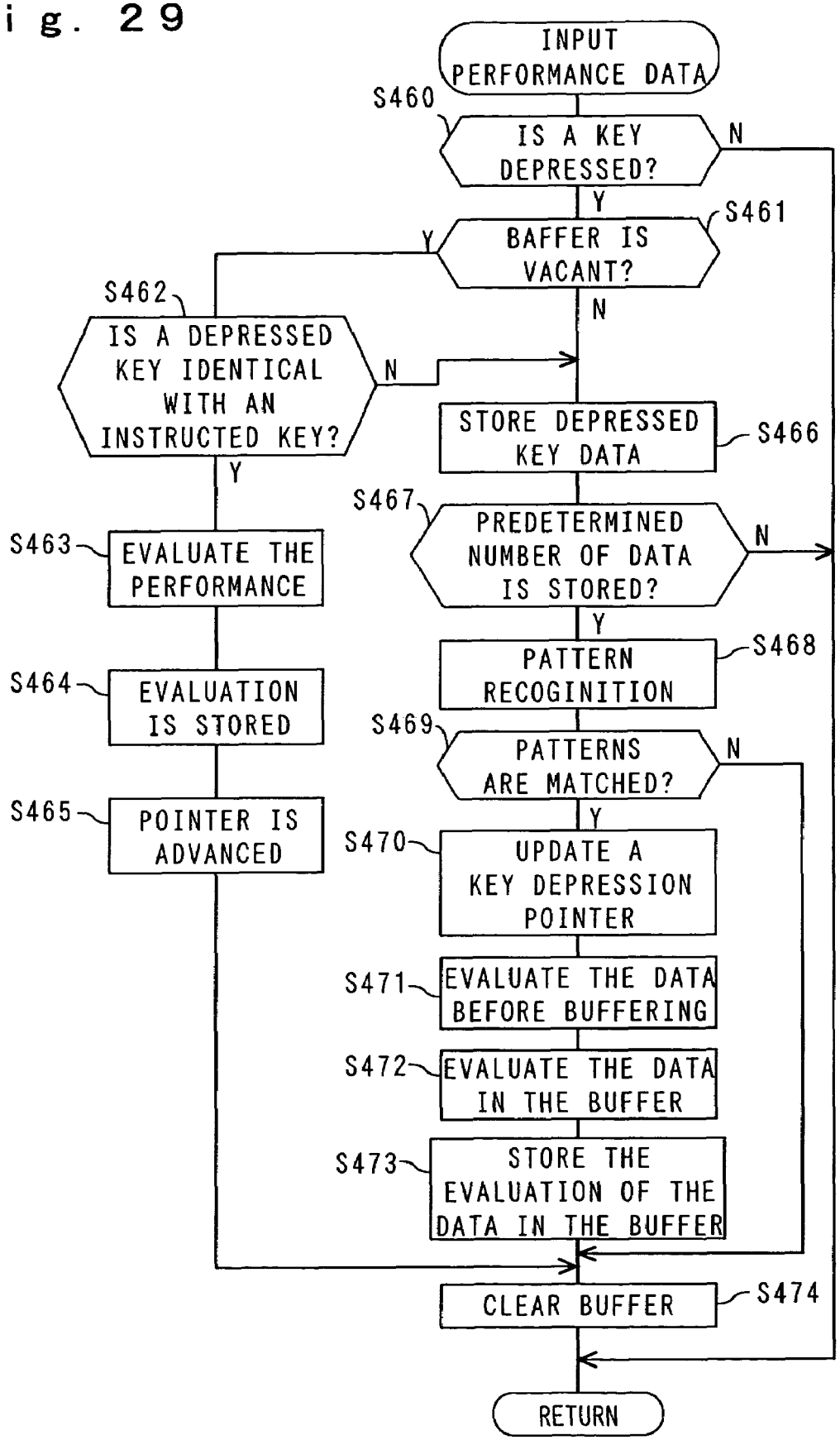
FIG. 29 is a flowchart showing input processing of key depression tones.

FIG. 29 is a flowchart showing the input processing of the performance result for an another example of result evaluation. In step S460, it is judged whether the key depression is performed. If key depression is detected, process proceeds to step S461, to judge whether a played note storage area (buffer) for storing the played note or the depressed key information is cleared. If the buffer is vacant, process proceeds to step S462. On the other hand, if at least one depressed key data is stored in the buffer, process proceeds to step S466.

In step S462, the pitch of the tone related to the key depression is examined. In other words it is judged whether the pitch of the performance data for generating the key depression instruction indicated by a key depression instruction pointer is identical with the pitch of the tone corresponds to the depressed key. In this embodiment, the pitch of each data or tone can be represented by a key number and a note number respectively, for simplifying the comparison process. If these are identical, process proceeds to step S463, to evaluate the performance by comparing the depressed key and the key depression instruction in the performance data indicated by the key depression instruction pointer. In step S464, the evaluation is stored in an evaluation storage area described later. The evaluation of performance can be judged, for example, depending on how much the key-on timing is deviated between the performance data and the depressed key. The key-on timing is represented, for example, by a step time, that is, a duration time from the bar line, and measured by a counter. In step S465, the key depression instruction pointer is advanced forward. By updating the key depression instruction pointer, a further performance data is read out to generate a new key depression instruction mark, and the current key depression instruction mark is scrolled out.

When the pitch of the note (note number) indicated by the key depression instruction pointer and the pitch of the depressed key tone (key number) are not identical, process proceeds from step S462 to step S466. In step S466, the depressed key data, for example, the pitch (key number) and the key-on timing are stored in the buffer. In step S467, it is judged whether a predetermined number of data has been stored in the buffer. It is for judging whether there is enough number of data preferable for performing pattern recognition at high accuracy, for deciding whether the note array (pitch array) in the performance data coincides with the pitch array in the data stored in the buffer. The buffer can store, for example, maximum five data for depressed key data, and when five data for depressed key data are stored therein, the judgment in step S467 becomes affirmative.

It is desired that the buffer be constructed like a ring buffer, in which the data input later is sequentially overwritten on the oldest data. In other words, data relating to five notes newly played by key depression, after a note has been played at a different pitch from that of the instructed note, is stored in the buffer.

If the judgment in step S467 is affirmative, process proceeds to step S468. When a predetermined number of depressed key data is not stored, the judgment in step S467 is negative, and in this case, process returns to main routine, to start the processing from step S460 again, when the key event is generated next.

In step S468, pattern recognition, that is, pattern comparison between the stored data in the buffer and the performance data is performed. The performance data, which is an object of the pattern recognition, is the data subsequent to the current data indicated by the key depression instruction pointer. In step S469, it is judged whether the patterns are coincide with each other. If patterns are matched, process proceeds to step S470, to update the key depression instruction pointer. Here, the key depression instruction pointer is advanced to the position next to the area where the pattern matching has been successful. By updating the key depression instruction pointer, the key depression instruction mark is scrolled.

In step S471, the evaluation relating to the key depression tone before the area where the pattern matching has been successful is stored in the evaluation storage area. Since there is no key depression tone in the area before success of pattern match, low evaluation is written as being not played. In step S472, the pitch and the key-on timing are evaluated, with respect to the respective depressed key data in the stored data in the buffer. In step S473, the stored data in the buffer and the evaluation results in step S472 are stored in the evaluation storage area. In step S474, the buffer is cleared. When the buffer is cleared, the displayed image for the key depression instruction is updated at the same time and scrolled so as to give the key depression instruction of the current note indicated by the pointer. In the case of music with accompaniment, the pointer for reproducing the accompaniment is also shifted to the corresponding position.

Figures 30, 31, 32:
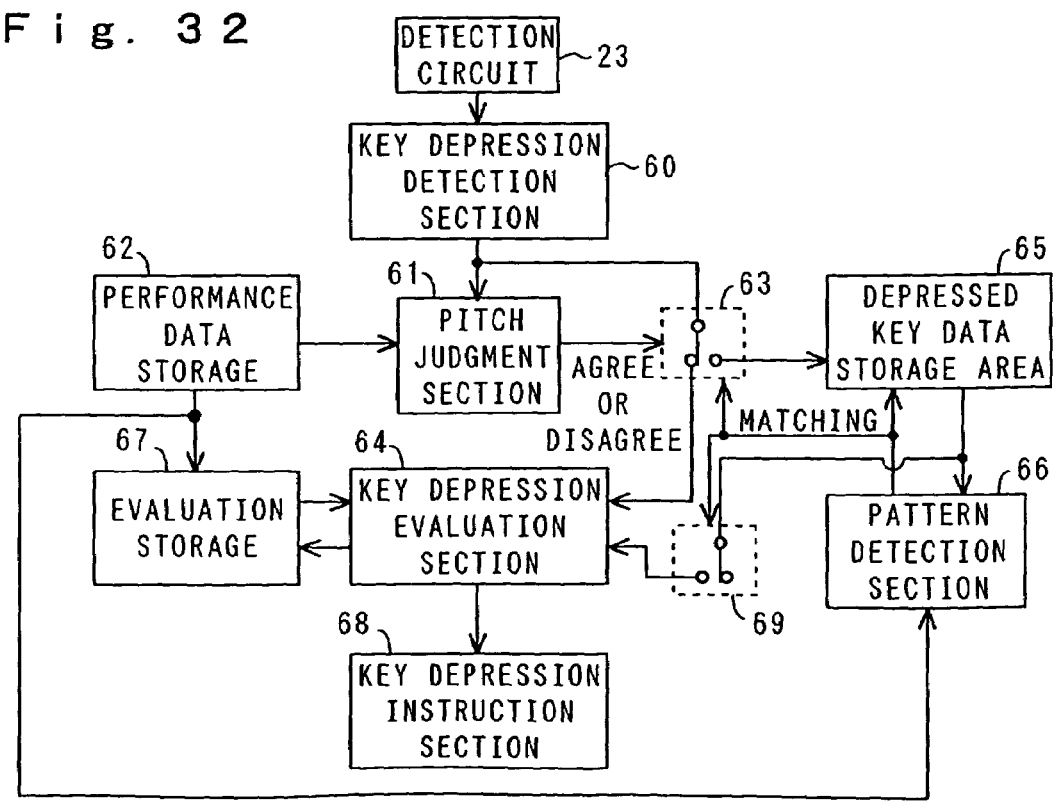
FIG. 30 is a diagram showing an example of data structure in an evaluation storage area.
FIG. 31 is a diagram showing an example of data structure in a played note storage area.
FIG. 32 is a block diagram showing the main function of a musical performance self-training apparatus according to the fifth embodiment of the present invention.

FIG. 30 is a diagram showing the structural example of the evaluation storage area. In this figure, the pitch of a note corresponds with a depressed key and the key-on timing are stored as the performance data for each pointer number. In this figure, the number indicating the pitch is represented by note number. In the same pointer number, there are described the actual key-on timing and the evaluation thereof, that is, the grade (S, A, . . . ) based on the deviation between the key-on timing in the performance data and the actual key-on timing. As the performance data for the evaluation, not only the key-on timing but also the key-on length and velocity may be included, but for the brevity of explanation, only the key-on timing is stored in the evaluation storage area herein.

FIG. 31 is a diagram showing the structural example of the depressed key data storage area, that is, the buffer. The pitch of the key (note number) actually depressed and the key-on timing are stored in the buffer. In this figure, only three data are stored, but it is set such that the buffer can store up to five data. However, the size of the buffer is not limited thereto. The data accumulation may be set so as to follow the performance, by detecting the music part being played at present by pattern recognition.

FIG. 32 is a main functional block diagram showing the process of the depressed key data. In this figure, a key depression detection section 60 detects depressed key data input from the detection circuit 23, and inputs this data representing depressed key tone to a pitch judgment section 61. The pitch judgment section 61 compares the pitch as a note number in the performance data input according to the current pointer from a performance data storage 62 with the pitch as a key number of the depressed key tone. The pitch judgment section 61 outputs an agreement signal when the pitches agree with each other, or outputs disagreement signal when the pitches do not agree with each other.

A switch 63 is changed over to a key depression evaluation section 64 while the agreement signal is output, and changed over to a depressed key data storage area (buffer) 65 in response to the disagreement signal. Once the switch 63 is changed over to the buffer 65, the switch 63 is kept in the state changed over to the buffer 65, until a matching signal is input from a pattern detection section 66. The key depression data is input from the key depression detection section 60 to the section to which the switch 63 is changed over.

The performance data (pitch, key-on timing and the like) read from the performance data storage 62 is stored in an evaluation storage 67 for evaluation of the key depression. The key depression evaluation section 64 compares the stored data in the evaluation storage 67 with the key depression data, to give predetermined evaluation based on the difference between these data. The evaluation is stored in the evaluation storage 67. When evaluation of the key depression data has finished, scroll of the key depression instruction is instructed to a key depression instruction section 68.

The depressed key data storage area 65 stores the key depression data in which the key number, that is, a representative of the pitch does not agree with the stored data. The key depression data stored in the depressed key data storage area 65 is input to the pattern detection section 66. The pattern detection section 66 searches the performance data before the current pointer, of the data in the performance data storage 62, to detect a pattern (note array) in the performance data which agrees with the depressed key data stored in the depressed key data storage area 65. When a pattern coincide with the depressed key data is detected, a matching signal is output, a switch 69 is changed over to the key depression evaluation section 64, the depressed key data stored in the depressed key data storage 65 is input to the key depression evaluation section 64 and evaluated, and the evaluation result is described in the evaluation storage 67. The depressed key data storage 65 is cleared by the matching signal, and the switch 63 is changed over to the key depression evaluation section 64.

According to this embodiment, when performance is not conducted as instructed by the key depression instruction, the depressed key data thereafter is stored in the buffer. By performing pattern comparison between the stored data and the performance data, a coincident portion between the current key depression position and the performance data can be detected, thereby a pointer for reading the data for the key depression instruction can be updated. Moreover, evaluation relating to the stored data can be obtained.

Figure 33:
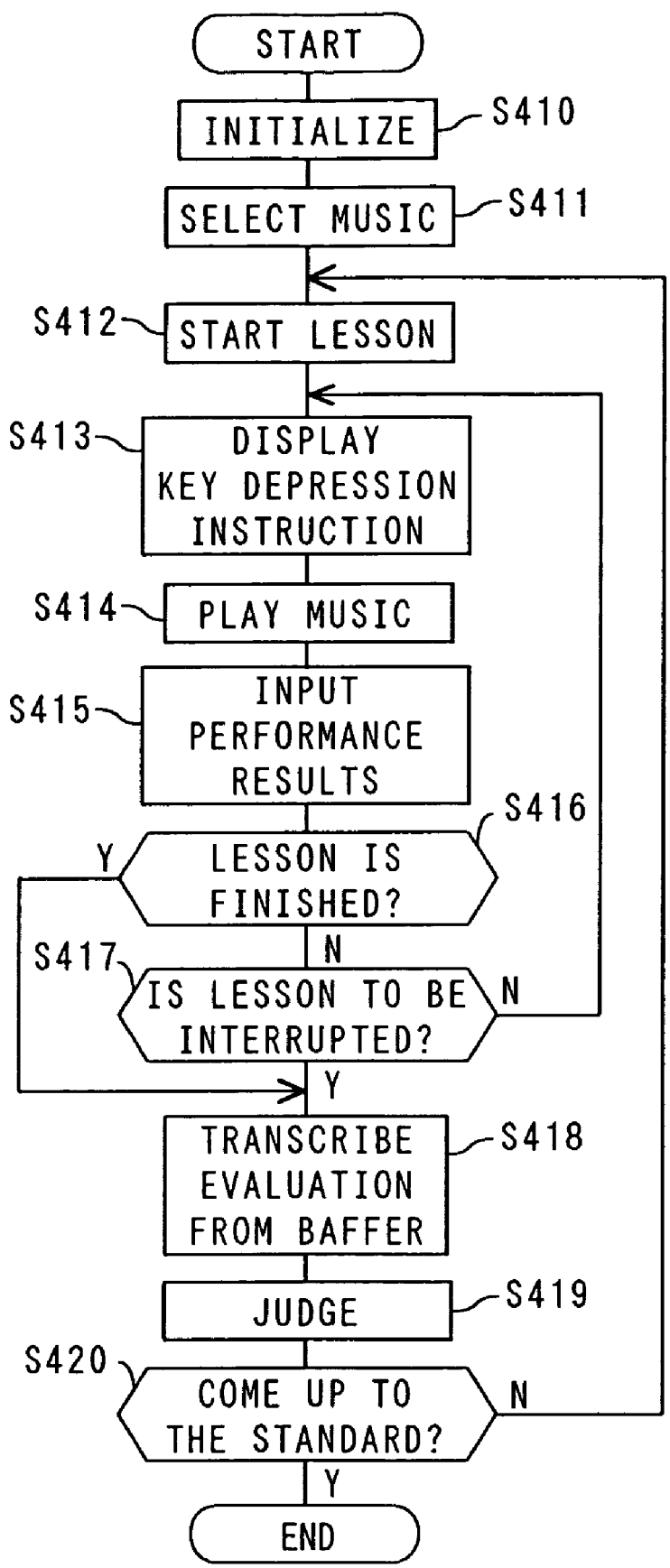
FIG. 33 is a main flowchart in the sixth embodiment.

FIG. 33 is a main flowchart showing another embodiment of the invention. Steps S410 to S416 are processed as in steps S301, S302, and step S304 to S307 in FIG. 22. When there is performance data to be read, the judgment in step S416 is negative, and process proceeds to step S417. When there is no performance data, the judgment in step S416 is affirmative, and process proceeds to step S418. In step S417, it is judged whether the lesson is to be interrupted. If there is no lesson interrupting instruction from the player during predetermined waiting time, process proceeds to step S413 to continue the key depression instruction. If there is a lesson interrupting instruction, process proceeds to step S418.

In step S418, the evaluation of performance stored in a buffer (described later) and the key-on timing are transcribed in an evaluation storage area similar to that shown in FIG. 30. This buffer is different from the buffer, that is, the depressed key data storage 65 in the previous embodiment, which stores the performance result after a miss-touch, in that the performance results from the beginning are stored therein.

In step S419, result judgment is conducted based on the evaluation. In step S420, it is judged whether the performance is acceptable, as a result of the result judgment. If the performance is acceptable, the processing finishes, and if the performance is not acceptable, process proceeds to step S412.

Figure 34:
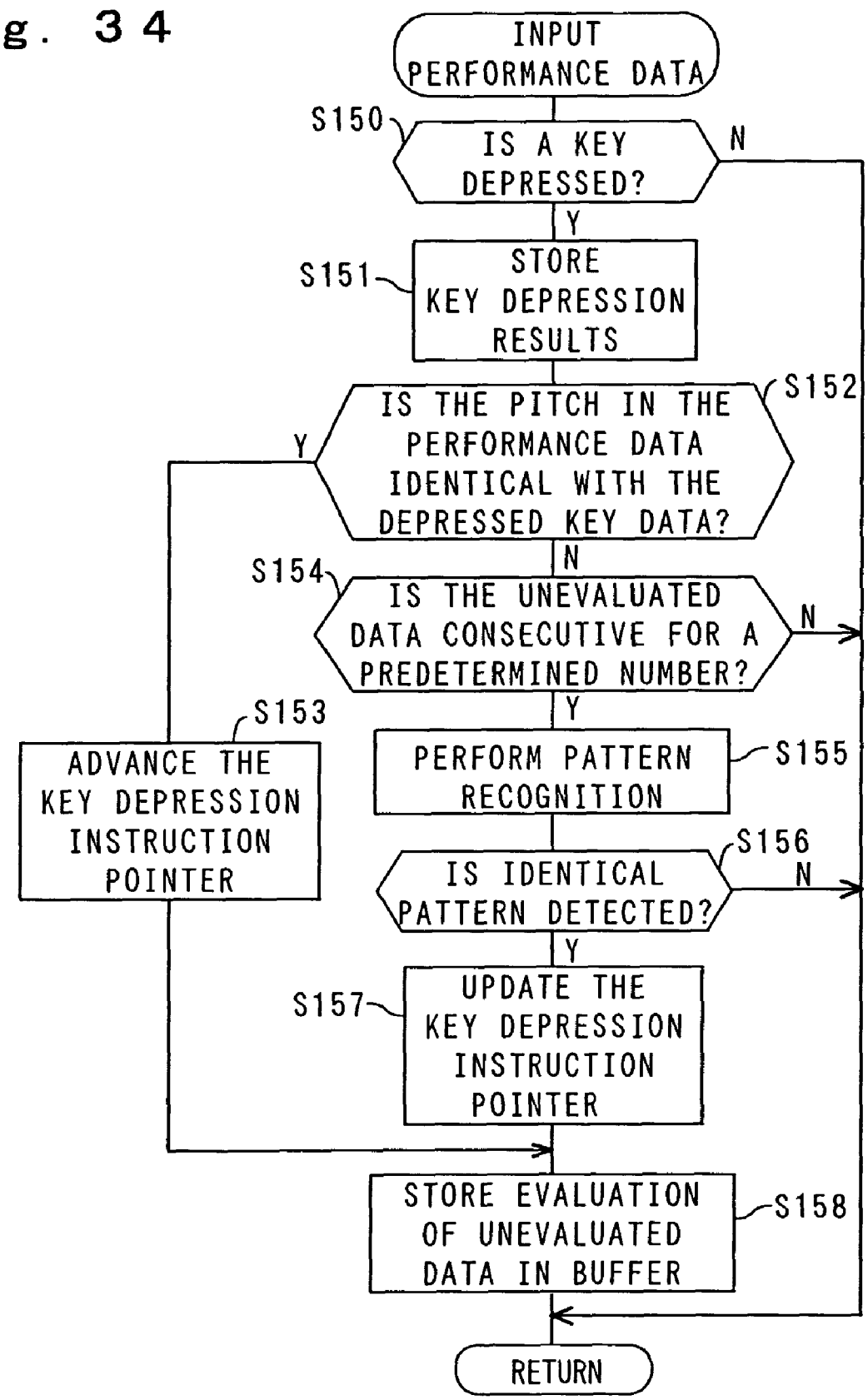
FIG. 34 is a flowchart showing the input processing of performance result.

FIG. 34 is a flowchart showing the details of input processing (step S415) of the performance result. In step S150, it is judged whether key depression is performed. If key depression is detected, process proceeds to step S151, to store the key depression results (key number and key-on timing) in a depressed key data storage area. In step. S152, it is judged whether the pitch in the performance data for the key depression instruction indicated by a key depression instruction pointer is identical with the pitch in the depressed key data, that is, the depressed key number. If these are identical, process proceeds to step S153, to advance the key depression instruction pointer forward. Since the key depression instruction pointer is updated, the key depression instruction mark is scrolled.

When the pitch in the performance data for the key depression instruction and the pitch of the key depression data are not identical, process proceeds to step S154. Instep S154, it is judged whether the number of unevaluated notes in the buffer is consecutive for a predetermined number. The predetermined number is a number suitable for pattern recognition, and for example, is set to five. If the number of unevaluated notes is consecutive for the predetermined number (for example, 5), process proceeds to step S155, to perform pattern recognition where a judgment whether the stored data array in the buffer is identical with the performance data array is performed. The performance data, which is the object of pattern recognition, is not the data subsequent to the current key depression instruction pointer, but all data of the selected music. In this manner, not only when the player has a miss-touch, but also when the player returns to and plays an optional music part, the music part can be detected by pattern recognition, to give the key depression instruction.

In step S156, it is judged whether the identical pattern is detected. If the identical pattern is detected, process proceeds to step S157 to update the key depression instruction pointer. In other words, the key depression instruction pointer is advanced to the position subsequent to the area where the pattern or the data array is identical. Since the key depression instruction pointer is updated, the key depression instruction mark is scrolled.

In step S158, the unevaluated key depression data in the buffer are evaluated, and the evaluation thereof is stored in an evaluation storage area in the buffer. The key-on timing of the instructed note is compared with the input key-on timing and the evaluation is determined based on the difference between them.

Figures 35, 36:
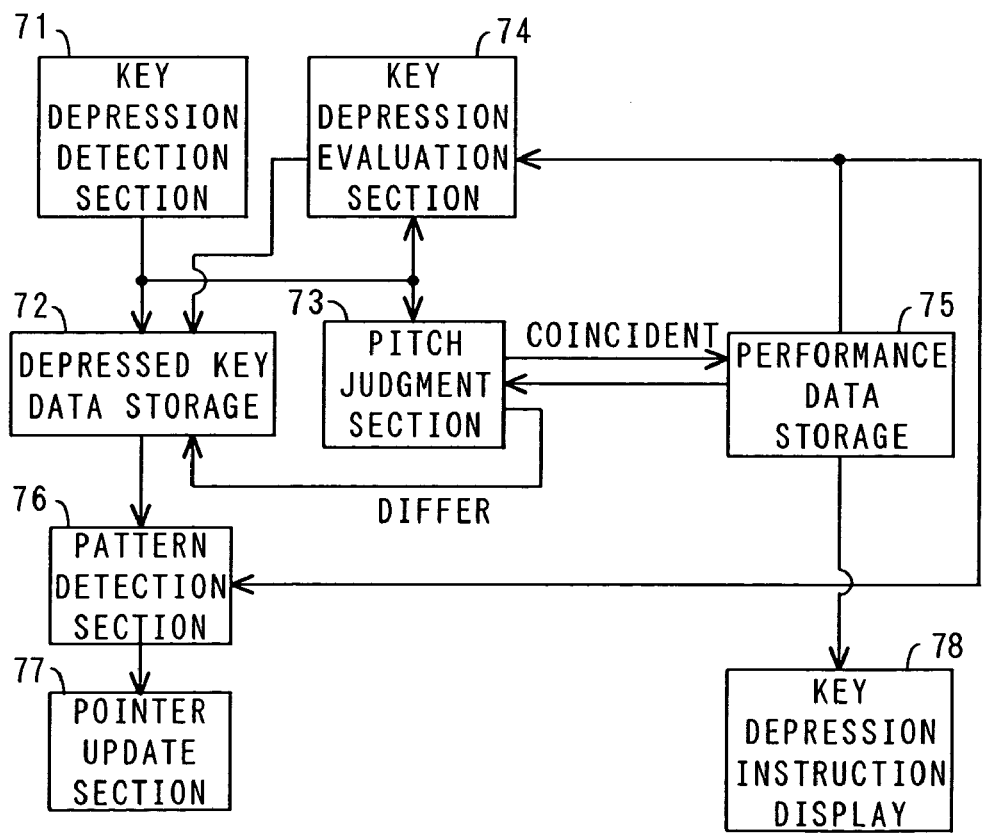
FIG. 35 is a diagram showing a structural example of the played note storage area (buffer)
FIG. 36 is a main functional block diagram showing the main function of a musical performance self-training apparatus of the sixth embodiment.

FIG. 35 is a diagram showing the structural example of the depressed key data storage (buffer) according to this embodiment. The pitch of sound corresponding to the key actually played and the key-on timing are stored in the depressed key data storage from the beginning of the lesson. Different from the buffer in FIG. 31, the evaluation storage area is provided in this buffer.

FIG. 36 is a main functional block diagram showing processing of depressed key data according to the embodiment of FIG. 34. The key depression data detected by a key depression detection section 71 is stored in the depressed key data storage 72. Of the depressed key data, the key number is input to a pitch judgment section 73 and the key-on timing is input to a key depression evaluation section 74. The key depression evaluation section 74 evaluates the depressed key data judged that the pitches coincide with each other by the pitch judgment section 73. The evaluation is stored in the depressed key data storage 72.

When the pitch judgment section 73 judges that the pitch in the depressed key data does not coincide with the instructed pitch, a plurality of predetermined number of newest depressed key data stored in the depressed key data storage 72 and the performance data stored in a performance data storage 75 are input to a pattern detection section 76, and the performance data row or array whose pattern coincides with that of the depressed key data is detected. Coincidence of the pattern is realized when at least the arrays of the pitch coincides with each other. In addition to the pitch, coincidence of time data between notes based on the key-on timing may be detected. When the coincidence pattern is detected, a pointer update section 77 shifts the pointer to the data subsequent to the pattern coincidenced performance data. According to this pointer, the performance data is read out from the performance data storage 75 to a key depression instruction display 78.

In the respective embodiments described above, it is assumed that pattern coincidence between the depressed key data and the performance data is realized when the respective pitch arrays coincide with each other. However, the pattern recognition method is not limited thereto, and coincident of performance or key depression timing may be detected, in addition to the coincident of pitches.

Pattern coincident does not mean complete coincident between the depressed key data and the performance data. Even if there is a slight difference in the key-on timing or a miss-touched key, when the difference or lack is of a degree that a plurality of depressed key data can be judged to have a similar pattern as a whole, it can be considered that these coincide with each other in view of the coincident of the array, that is, the patterns agree with each other.

Figures 37, 39:
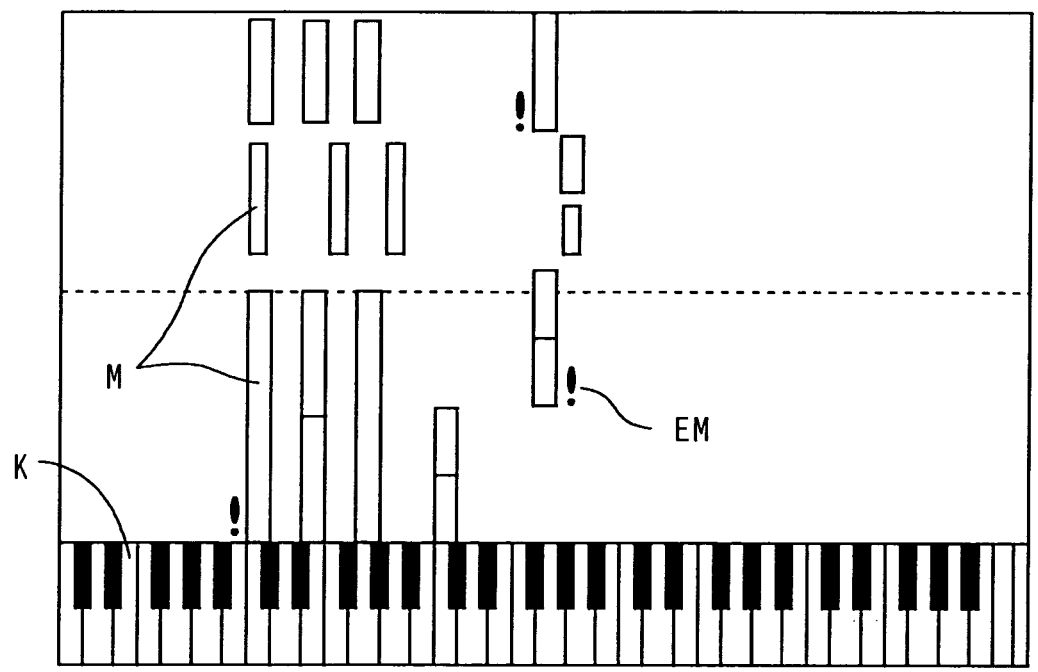
FIG. 37 is a diagram showing a display example of a key depression instruction.
FIG. 39 is a diagram showing an example of advice information search data.

FIG. 37 is a diagram showing an another example of the key depression instruction displayed on the display 14. In this figure, a keyboard figure K is displayed in the lower part of the screen. In order to make it easy to see to which key on the keyboard the key depression instruction corresponds, the keyboard figure K may be displayed not only on the lower part of the displayed image but also on the upper part of the displayed image. Which key on the keyboard 21 is to be played is described by a key depression instruction mark M above the keyboard figure K. The key depression instruction mark M is displayed at a key position corresponding to the key to be played, with a length which allows the player to understand the length of the note, for example, with respect to notes for two bars. For example, a quarter note is expressed by a length twice the length of an eighth note, and a mark M indicating a white key to be played is displayed wider than a mark M indicating a black key to be played.

On the display, the vertical direction indicates a time axis, and the key depression instruction mark M is scrolled downward with the progress of the musical performance. The key corresponding to the key depression instruction mark M closer to the lower keyboard figure K indicates a key to be played at the earlier timing. The key corresponding to the key depression instruction mark M whose lower end abuts against the upper edge of the keyboard figure K is the key that should be being played at present.

With respect to the key depression instruction mark M, an exclamation mark (hereinafter referred to as an "advice icon") EM is displayed if necessary. This advice icon EM is indication means for referencing a performance technique that cannot be expressed only by the key depression instruction mark M and matters to be noted (hereinafter referred to as "advice data"). The player can access an information indicating the performance technique such as fingering, by indicating the advice icon EM by the mouse 13 during the performance.

Figure 38:
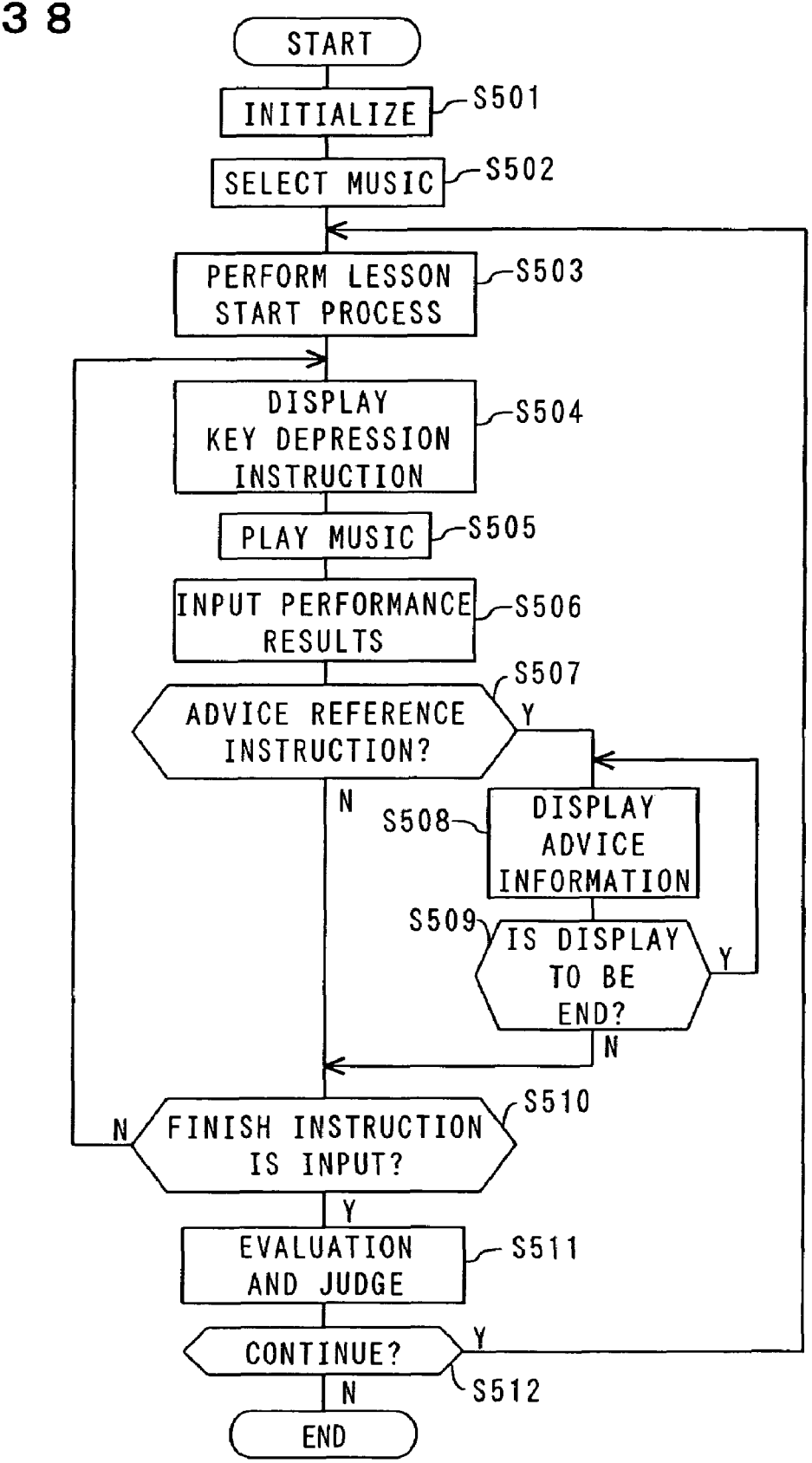
FIG. 38 is a flowchart showing the operation of the musical performance self-training apparatus.

FIG. 38 is a flowchart showing a main process for displaying key depression instruction where the advice icon is included. In the following description, the descriptions for the step S501 through S506 are omitted, as they are similar to the steps S1, S2 and steps S4 through S7 of FIG. 4.

In step S507, it is judged whether the advice access instruction has been input, that is, the advice icon EM has been indicated. When it is judged that the advice access instruction has been input, process proceeds to step S508, to display the advice information corresponding to the advice icon EM on the display 14. The access page for the advice information is not only the one in the memory (hard disk, ROM and the like) of the PC body 11, but may be obtained by accessing a website on the Internet.

In step S509, it is judged whether the advice information display is to be finished. The information display end icon is displayed on the advice information display screen, and when this information display end icon is operated, the judgment in step S509 becomes affirmative.

In step S510, it is judged whether the predetermined lesson has been finished. The entire music may be the training object, but a music part such as bars may be designated beforehand, and this part may be the playing object. When the part corresponding to all the designated performance data has been played, the judgment in step S510 becomes affirmative, and process proceeds to step S511. When the lesson has not been finished, process proceeds from step S510 to step S504.

In step S511, it is judged whether the evaluation of the performance result read in step S506 has reached the acceptable standard. In step S512, it is judged whether the lesson is to be continued. If there is no instruction to continue the lesson within a predetermined waiting time, the processing finishes. If there is an instruction to continue the lesson, process proceeds to step S503. The instruction to continue the lesson can be input from the keyboard 12, or by indicating the continue icon that can be displayed on the display.

FIG. 39 is a diagram showing an example of information structure for searching the advice information, wherein the information is stored in the performance data, corresponding to the advice icon EM. In the figure, "timing" indicates time from the beginning of the music, and "sign ID" indicates an identification code for specifying a note, a sign such as a clef and a pedal mark or an area in the displayed musical score. Since the access page for the advice information can be held not only in the memory of the PC body 11, but also in the server on the Internet, a file name on the hard disk or an URL of the website on the Internet is described as a link address of the access page.

Figures 40A, 40B:
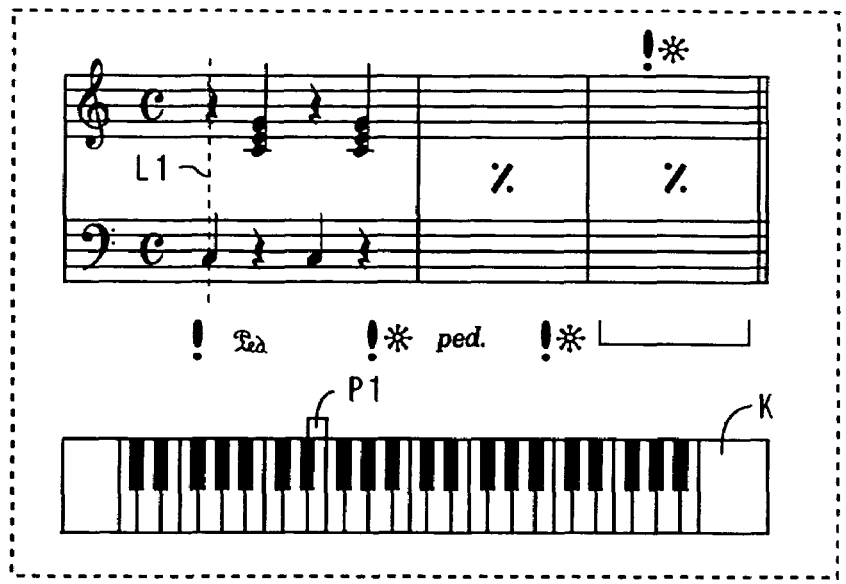
FIG. 40A is a diagram showing a display example of key depression instruction information.
FIG. 40B is a diagram showing a display example of the searched advice information.

In FIG. 40A, the key depression instruction information is shown on the score. Dotted line L1 indicates the key depression timing. That is, by this line L1, a tone to be played now is indicated. A mark P1 indicating a key on the keyboard figure K corresponding to this tone is added thereto. The line L1 moves to the right on the displayed image, to indicate the tone to be played or key to be depressed. The advice icon EM is shown above such key depression instruction information. The advice icon EM is arranged near a pedal mark, indicating that the explanation for the pedal mark can be searched as the advice information.

FIG. 40B shows one example of explanation searched in response to the selection of the advice icon EM in FIG. 40A.

FIGS. 41A and 41B are diagram showing another example of advice information displayed on the display 14. In FIG. 41A, the key depression instruction information is shown on the score. The advice icon EM is described on the note, and the performance technique can be searched as the advice information.

FIG. 41B shows the explanation for the advice icon EM in FIG. 41A. Here, of the fingering techniques, a technique referred to as "finger crossing" is explained.

Figure 42:
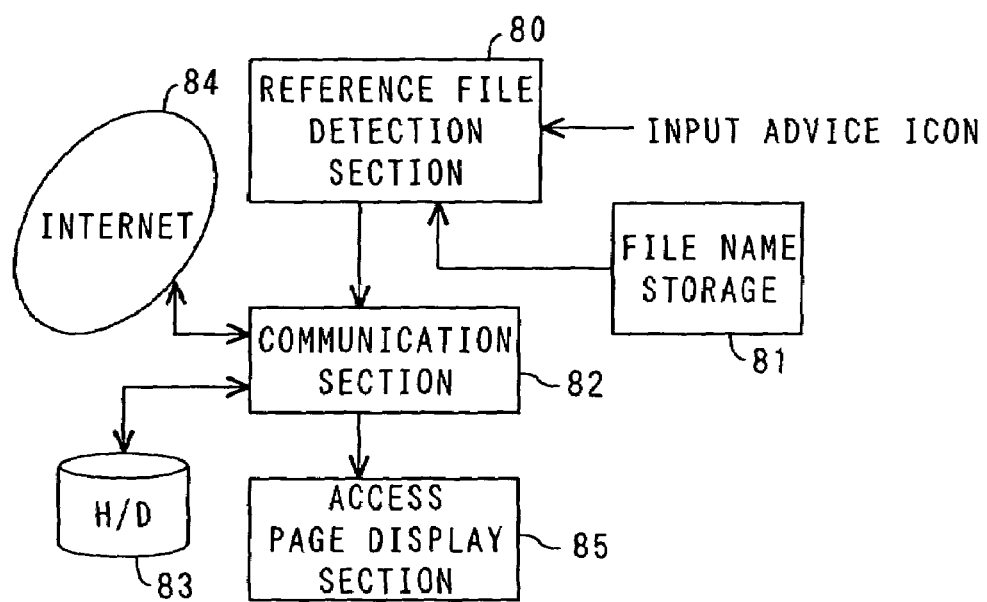
FIG. 42 is a block diagram showing the main function of a musical performance self-training apparatus according to one embodiment of the present invention.

FIG. 42 is a main functional block diagram showing the processing of the key depression tone data according to one embodiment of the present invention. When the advice icon EM is operated, a reference file detection section 80 refers to a file name storage 81 to detect a file name including the page which has the advice information corresponding to the operated icon. The detected file name is provided to a communication section 82, and the communication section 82 accesses a hard disk 83, being the memory in the PC body 11 or a website on the Internet 84, based on the file name, to obtain the advice information. The obtained advice information is displayed on the display 14, using the software set in an access page display section 85.

When the advice information is displayed, the advice information may be displayed instead of the key depression instruction display, or the key depression instruction may be left as it is, and the advice information may be superimposed there on and displayed. The advice information may contain only character information, or for example, may contain animation images and photographs for explaining fingering. The advice icon informing the existence of the advice information includes not only a figure, but also a character or a character string.

As is obvious from the above explanation, according to the present inventions, the training part can be designated with units having different sizes for each skill level, and when a predetermined unit in each skill level reaches the acceptable standard, training for the upper skill level is performed. Therefore, the skill level can be gradually elevated, while gradually extending the training range.

The player can have a look at the progressing degree of training in the lesson menu. Since the player does not train for the units having the same content repetitively, the training efficiency is increased, and the player is not bored due to monotonous training.

Since the unit can be reset according to the preference, so as to enable easy training of the player, the training efficiency can be increased.

According to the present inventions, the designation of the unit can be performed automatically or manually. Therefore, not only a standardized performance instruction in which the progress is determined automatically is possible, but also the progress can be advanced or returned according to the preference of the player.

According to the present inventions, the auto-mode and the manual mode can be selected on the lesson menu. During the auto-mode, when the lesson is interrupted, the lesson menu is displayed, so that a unit can be designated manually. Therefore, even when the training is executed in the auto-mode, and the current continuous units have not been finished, the player can choose to go ahead or return to the beginning to have another training.

According to the present inventions, when predetermined units in each skill level have reached the acceptable standard, the player proceeds to training in the upper ranking skill level. As a result, while gradually extending the training range, the player can elevate the skill level gradually.

According to the present inventions, the performance instruction and the performance evaluation can be displayed in a plurality of display modes. Particularly, in the score view mode, a display suitable for a player who can read the musical score can be made, and in the piano roll view mode, a display in which even a player who cannot read the musical score can easily understand the performance instruction can be made. By changing over these display modes, players who cannot understand the musical score can learn the correspondence between the mark and the score, according to their interest. In the superimpose mode, by displaying a plurality of display modes at the same time, the correspondence between the mark and the score can be directly learnt.

The performance evaluation can be also displayed in a preferred display mode, which is easy to understand.

According to the present invention, since musical performance is evaluated by comparing the information relating to the performance timing with the model information, the player's ability, which cannot be judged by the evaluation of whether the player has played at the instructed pitch, can be judged, such as the rhythmic sense and accuracy of understanding with respect to the music. According to the present invention, unification of the whole performance can be judged. Moreover, the evaluation can be visually recognized. Particularly, according to the invention of claim 6, evaluation of performance can be seen corresponding to the performance instruction display.

According to the present invention, since the player's ability can be specifically judged, when the training grade is elevated, appropriate result evaluation standard can be set for each grade, linked with the judgment result.

According to the invention, the progress of the key depression instruction is advanced forward when the key is depressed as instructed. However, even if the key is not depressed as instructed, the current position in the performance data is judged by the pattern recognition method based on the depressed key number stored in the buffer. Performance is resumed from the position subsequent to the current position. Therefore, even when the current position is lost due to a slight miss-touch or expemporization, the position can be found immediately to resume the instruction.

Since the training is not interrupted due to a slight miss or expemporization, the player can freely play without being forced to do faithful performance as instructed by the performance instruction at all times. Moreover, flexible training is possible without fearing for a slight mistake.

According to the invention, even when the depressed key number is not as instructed, evaluation is possible with respect to the stored performed data, and hence the player can recognize objective evaluation.

According to the present invention, the player can obtain the advice information according to need, when he/she finds the advice icon during performance. Therefore, since the player can advance the training, while understanding an uncertain point such as the style of rendition one by one, the player can make progress quickly. Explanation of signs on the musical score, which a beginner cannot understand, and techniques that do not appear on the musical score can be designated as the advice information, thereby enabling realization of integrated performance instruction. Particularly, since the advice information can be obtained through the Internet, the data amount stored in a recording medium equipped in the musical performance self-training apparatus can be reduced, and enough information can be searched.

What is claimed is:

1. A musical performance self-training apparatus for supporting a player by displaying a performance instruction information on a display means, comprising:
   a unit designating means for designating a unit from plural units, wherein the plural units constitute a music to be performed and each unit includes a predetermined size of musical tone information;
   a performance instruction information generating means for generating a performance instruction information based on the musical tone information of the unit which is designated by the unit designating means; and
   a lesson menu generating means for generating an image information of a lesson menu which has a score of a music to be played and of units corresponding to the score, and outputting the image information to the display means, wherein
   the unit designating means designates a unit automatically, the designated unit corresponding to a score of performance instruction information to be displayed next, wherein
   the lesson menu having the units corresponding to the score to include a wider range of musical tone information as a skill level of the player becomes higher, is displayed according to the skill level of the player corresponding to the score, and wherein
   the unit designating means designates a unit to be played at the earliest timing, in which performance thereof has not reached a predetermined acceptable standard, from the units on the lesson menu, as a unit of which performance instruction is to be displayed next, and when performance of all units in a same skill level has reached the predetermined acceptable standard, the unit of which performance instruction is to be displayed next is selected from units in an upper ranking skill level than the current skill level and is designated.

2. A musical performance self-training apparatus for supporting a player by displaying a performance instruction information on a display means, comprising:
   a unit designating means for designating a unit from plural units, wherein the plural units constitute a music to be performed and each unit includes a predetermined size of musical tone information;
   a performance instruction information generating means for generating a performance instruction information based on the musical tone information of the unit which is designated by the unit designating means; and
   a lesson menu generating means for generating an image information of a lesson menu which has a score of a music to be played and of units corresponding to the score, and outputting the image information to the display means, wherein
   the unit designating means designates a unit automatically, the designated unit corresponding to a score of performance instruction information to be displayed next, wherein
   the lesson menu having the units corresponding to the score to include a wider range of musical tone information as a skill level of the player becomes higher, are displayed according to the skill level of the player corresponding to the score, and wherein
   the unit designating means designates a unit to be played at the earliest timing, in which performance thereof has not reached a predetermined acceptable standard, from the units on the lesson menu, as a unit of which performance instruction is to be displayed next, and when performance of all units in a lower ranking skill level included in a unit of a higher ranking skill level has reached the predetermined acceptable standard, the higher ranking unit is designated as the unit of which performance instruction is to be displayed next.

3. A musical performance self-training apparatus for supporting a player by displaying a performance instruction information on a display means, comprising:
   a unit designating means for designating a unit from plural units, wherein the plural units constitute a music to be performed and each unit includes a predetermined size of musical tone information;
   a performance instruction information generating means for generating a performance instruction information based on the musical tone information of the unit which is designated by the unit designating means; and
   a lesson menu generating means for generating an image information of a lesson menu which has a score of a music to be played and of units corresponding to the score, and outputting the image information to the display means, wherein
   the lesson menu having the units corresponding to the score to include a wider range of musical tone information as a skill level of the player becomes higher, is displayed according to the skill level of the player corresponding to the score, wherein
   the unit designating means designates a unit automatically, the designated unit corresponding to a score of performance instruction information to be displayed next, and wherein the display means separately displays a trained unit and a unit for which note information is to be displayed next, at the time of displaying the lesson menu.

4. A musical performance self-training apparatus for supporting a player by displaying a performance instruction information on a display means, comprising:
   a unit designating means for designating a unit from plural units, wherein the plural units constitute a music to be performed and each unit includes a predetermined size of musical tone information;
   a performance instruction information generating means for generating a performance instruction information based on the musical tone information of the unit which is designated by the unit designating means; and
   a lesson menu generating means for generating an image information of a lesson menu which has a score of a music to be played and of units corresponding to the score, and outputting the image information to the display means, wherein
   the unit designating means designates a unit automatically, the designated unit corresponding to a score of performance instruction information to be displayed next, and wherein the display means separately displays a unit which comes up to an evaluation standard and a unit which does not come up to the evaluation standard, at the time of displaying the lesson menu.

5. The musical performance self-training apparatus according to claim 4, further comprising result processing means which evaluates the performance result of the designated unit, wherein the display means displays the evaluation standard in the trained unit, at the time of displaying the lesson menu.

6. A musical performance self-training apparatus for supporting a player by displaying a performance instruction information on a display means, comprising:
   a unit designating means for designating a unit from plural units, wherein the plural units constitute a music to be performed and each unit includes a predetermined size of musical tone information;
   a performance instruction information generating means for generating a performance instruction information based on the musical tone information of the unit which is designated by the unit designating means; and
   a musical performance judgment apparatus for evaluating musical performances, wherein the performance judgment apparatus further comprises:
      a performance result storage means for storing information relating to a performance timing as a result of a musical performance;
      a judgment means for comparing the information relating to the performance timing with the information relating to the performance timing included in the performance instruction and detecting the difference therebetween; and
      an evaluation means for evaluating the performance, corresponding to the difference detected by the judgment means,
   wherein a plurality of items are stored in the performance result storage means for each played note, as the information relating to the performance timing,
   wherein the evaluation means extracts the items evaluated as best of the plurality of items with respect to all played notes, to evaluate the musical performance according to a mean value thereof,
   wherein the evaluation of the musical performance is the evaluation for each information of a plurality of items relating to the performance timing, and
   wherein the musical performance judgment apparatus further comprises means for graphically displaying an evaluation for each of the information.

7. The musical performance self-training apparatus according to claim 6, wherein the graphically displayed evaluation is displayed on one displayed image together with the performance instruction display.

8. A musical performance self-training apparatus for supporting a player by displaying a performance instruction information on a display means, comprising:
   a unit designating means for designating a unit from plural units, wherein the plural units constitute a music to be performed and each unit includes a predetermined size of musical tone information;
   a performance instruction information generating means for generating a performance instruction information based on the musical tone information of the unit which is designated by the unit designating means; and
   a musical performance judgment apparatus for evaluating musical performances, wherein the performance judgment apparatus further comprises:
      a performance result storage means for storing information relating to a performance timing as a result of a musical performance;
      a judgment means for comparing the information relating to the performance timing with the information relating to the performance timing included in the performance instruction and detecting the difference therebetween; and
      an evaluation means for evaluating the performance, corresponding to the difference detected by the judgment means,
   wherein the musical performance self-training apparatus further comprises a lesson menu generating means for generating an image information of a lesson menu which has a score of a music to be played and of units corresponding to the score, and outputting the image information to the display means,
   wherein the unit designating means designates a unit automatically, the designated unit corresponding to a score of performance instruction information to be displayed next,
   wherein a plurality of items are stored in the performance result storage means for each played note, as the information relating to the performance timing,
   wherein the evaluation means extracts the items evaluated as best of the plurality of items with respect to all played notes, to evaluate the musical performance according to a mean value thereof,
   wherein the evaluation of the musical performance is the evaluation for each information of a plurality of items relating to the performance timing, and
   wherein the musical performance judgment apparatus further comprises means for graphically displaying an evaluation for each of the information.

9. The musical performance self-training apparatus according to claim 8, wherein the graphically displayed evaluation is displayed on one displayed image together with the performance instruction display.

10. A musical performance self-training apparatus for supporting a player by displaying a performance instruction information on a display means, comprising:
   a unit designating means for designating a unit from plural units, wherein the plural units constitute a music to be performed and each unit includes a predetermined size of musical tone information;
   a performance instruction information generating means for generating a performance instruction information based on the musical tone information of the unit which is designated by the unit designating means; and
   a musical performance judgment apparatus for evaluating musical performances, wherein the performance judgment apparatus further comprises:
      a performance result storage means for storing information relating to a performance timing as a result of a musical performance;
      a judgment means for comparing the information relating to the performance timing with the information relating to the performance timing included in the performance instruction and detecting the difference therebetween; and
      an evaluation means for evaluating the performance, corresponding to the difference detected by the judgment means,
   wherein the musical performance self-training apparatus further comprises a lesson menu generating means for generating an image information of a lesson menu which has a score of a music to be played and of units corresponding to the score, and outputting the image information to the display means, wherein the unit designating means designates a unit automatically, the designated unit corresponding to a score of performance instruction information to be displayed next, wherein the unit designating means is configured to operate selectively in an automatic mode in which designation of the unit is automatically performed according to predetermined progress, or in a manual mode in which an optional unit can be designated by manual operation, wherein a plurality of items are stored in the performance result storage means for each played note, as the information relating to the performance timing, and wherein the evaluation means extracts the items evaluated as best of the plurality of items with respect to all played notes, to evaluate the musical performance according to a mean value thereof, wherein the evaluation of the musical performance is the evaluation for each information of a plurality of items relating to the performance timing, and wherein the musical performance judgment apparatus further comprises means for graphically displaying an evaluation for each of the information.

11. The musical performance self-training apparatus according to claim 10, wherein the graphically displayed evaluation is displayed on one displayed image together with the performance instruction display.

* * * * *